US010367300B2

(12) United States Patent
Shedletsky et al.

(10) Patent No.: US 10,367,300 B2
(45) Date of Patent: Jul. 30, 2019

(54) ELECTRICAL AND MECHANICAL CONNECTION MECHANISMS

(71) Applicant: Apple Inc., Cupertino, CA (US)

(72) Inventors: Anna-Katrina Shedletsky, Mountain View, CA (US); Erik G. de Jong, San Francisco, CA (US); Fletcher R. Rothkopf, Los Altos, CA (US); Samuel Weiss, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 15/108,777

(22) PCT Filed: Dec. 29, 2013

(86) PCT No.: PCT/US2013/078169
§ 371 (c)(1),
(2) Date: Jun. 28, 2016

(87) PCT Pub. No.: WO2015/099809
PCT Pub. Date: Jul. 2, 2015

(65) Prior Publication Data

US 2016/0322745 A1 Nov. 3, 2016

(51) Int. Cl.
*H01R 13/627* (2006.01)
*G06F 1/16* (2006.01)

(52) U.S. Cl.
CPC ......... *H01R 13/6278* (2013.01); *G06F 1/163* (2013.01)

(58) Field of Classification Search
CPC ............ H01R 13/6278; H01R 13/6273; H01R 13/6275; H01R 13/6582; G06F 1/163
(Continued)

(56) References Cited

U.S. PATENT DOCUMENTS

| | | | | |
|---|---|---|---|---|
| 3,032,651 A * | 5/1962 | Gisiger-Stahli | ........ | G04B 47/00 368/10 |
| 5,159,713 A * | 10/1992 | Gaskill | .................. | G04G 21/04 455/344 |

(Continued)

FOREIGN PATENT DOCUMENTS

| | | |
|---|---|---|
| CN | 1324030 | 11/2001 |
| CN | 101133521 | 2/2008 |

(Continued)

OTHER PUBLICATIONS

Description EP2560303, [database online], [retrieved on Aug. 8, 2018], Retrieved from the Internet: <http://translationportal.epo.org/emtp/translate/?ACTION=description-retrieval&COUNTRY=EP&ENGINE=google&FORMAT=docdb&KIND=A1 & LOCALE=en_EP&NUMBER=2560303&OPS=ops.epo.org/3.2&SRCLANG=fr&TRGLANG=en>.*

(Continued)

*Primary Examiner* — Travis S Chambers
(74) *Attorney, Agent, or Firm* — Kilpatrick Townsend & Stockton LLP

(57) ABSTRACT

An electronic device and an attachment element that includes one or more electronic components each include connection mechanisms. The connection mechanisms of the electronic device and the attachment element may be engaged to mechanically and electrically connect the electronic device and the attachment element. Such electrical connection may electrically couple the one or more electrical components of the attachment element to the electronic device. The connection mechanisms may utilize one or more of a variety of different mechanical connection mechanism such as one or more snap mechanisms, twist mechanisms, threaded mechanisms, detent mechanisms, spring mecha-
(Continued)

nisms, slide mechanisms, magnetic mechanisms, and/or any other mechanism for mechanical and electrical attachment.

20 Claims, 26 Drawing Sheets

(58) Field of Classification Search
USPC .......................................... 439/37, 350, 353
See application file for complete search history.

(56) References Cited

U.S. PATENT DOCUMENTS 5,392,261 A * 2/1995 Hsu .................... G04B 37/1413 368/281
5,588,862 A 12/1996 Perkins et al.
5,865,640 A * 2/1999 Tadokoro .............. G06F 1/1616 439/347
6,158,884 A * 12/2000 Lebby .................... G04B 47/00 224/165
7,513,019 B2 * 4/2009 Friedman ............... H04B 1/385 24/265 WS
7,837,503 B2 * 11/2010 Hartzell ............. H01R 13/6582 439/607.02
8,439,698 B1 * 5/2013 Saini ................... H04M 1/0254 361/679.41
9,786,982 B2 * 10/2017 Lee ........................ H01Q 1/273
9,851,753 B2 * 12/2017 Gao ........................ G06F 1/163
2001/0043514 A1 * 11/2001 Kita ..................... A44C 5/0015 368/281
2002/0085455 A1 * 7/2002 Haida ...................... A44C 5/14 368/281
2005/0237704 A1 * 10/2005 Ceresoli .................. G06F 1/163 361/679.03
2007/0064542 A1 * 3/2007 Fukushima ........ G04B 37/1486 368/282
2008/0043575 A1 * 2/2008 Fasciano .............. G04G 9/0076 368/13
2008/0074958 A1 * 3/2008 Moran ............... G04B 37/1486 368/282
2012/0087216 A1 * 4/2012 Keung ................ A44C 5/0084 368/282
2012/0194976 A1 * 8/2012 Golko ..................... G06F 1/163 361/679.01
2015/0130666 A1 * 5/2015 Pan ....................... H02J 7/0045 343/702
2015/0131216 A1 * 5/2015 Huang .................. H02J 7/0045 361/679.03
2016/0192526 A1 * 6/2016 Gao ........................ G06F 1/163 361/679.01
2016/0363957 A1 * 12/2016 Stroetmann ............. G06F 1/163
2017/0164699 A1 * 6/2017 Boutherin .......... G04B 37/1486

FOREIGN PATENT DOCUMENTS

CN 201131325 10/2008
CN 101367011 2/2009
CN 102448555 5/2012
EP 2560303 A1 * 2/2013 ........... H04B 5/0031
WO WO2010/126821 11/2010

OTHER PUBLICATIONS

International Search Report, PCT/US2013/078169, 9 pages, dated Sep. 3, 2014.
China Patent Application No. 201380081593.2, Office Action, dated Sep. 17, 2018, 22 pages.

* cited by examiner

ELECTRICAL AND MECHANICAL CONNECTION MECHANISMS

CROSS-REFERENCE TO RELATED APPLICATION

This application is a 35 U.S.C. § 371 application of PCT Patent Application No. PCT/US2013/078169, filed Dec. 29, 2013 and titled “Electrical and Mechanical Connection Mechanisms,” the disclosure of which is hereby incorporated herein by reference in its entirety.

TECHNICAL FIELD

This disclosure relates generally to connection mechanisms, and more specifically to connection mechanisms that electrically and mechanically connect devices to attachment elements.

BACKGROUND

Attachment elements are frequently utilized to couple devices to body parts of users and/or other objects. Such attachment elements may include bands, belts, straps, and other such elements and such devices may include watch bodies, belt buckles, backpacks, and/or other such devices. For example, a watch band may be utilized to couple a watch to the wrist, ankle, arm, and so on of a user. In this way, the device may be releasably attached to a user’s body part or other object.

In some cases, the device may be mechanically attached to the attachment element(s) utilizing one or more connection mechanisms. Such connection mechanisms may be releasably attachable in some cases such that the device may be attached and/or detached from the attachment element. Regardless, such connection mechanisms operate to mechanically attach the attachment element to the device.

SUMMARY

The present disclosure discloses systems and methods for electrically and mechanically connecting devices and attachment elements. One or more electronic devices and one or more attachment elements that include one or more electronic components may each include one or more connection mechanisms. The connection mechanisms of the electronic device and the attachment element may be engaged to mechanically and electrically connect the electronic device and the attachment element. Such electrical connection may electrically couple the one or more electrical components of the attachment element to the electronic device.

The electronic device may be any kind of electronic device such as an electronic watch, a laptop computer, a digital media player, a cellular phone, a smart phone, a mobile computing device, a tablet computing device, a pedometer, a heart rate and/or other body status monitor, and/or any other such electronic device. The attachment element may be any kind of attachment element that can couple the electronic device to a body part of a user and/or other object such as one or more bands, straps, and/or other such attachment element.

The connection mechanisms may utilize one or more of a variety of different mechanical connection mechanisms. Such mechanical connection mechanisms may include a variety of different snap mechanisms, twist mechanisms, threaded mechanisms, detent mechanisms, spring mechanisms, slide mechanisms, magnetic mechanisms, and/or any other mechanism for mechanical attachment. The connection mechanisms may also utilize one or more of a variety of different wired and/or wireless electrical connection mechanisms. Such electrical connection mechanism may include one or more electrical contacts and/or any other mechanism for electrical connection. In some cases, the mechanical connection mechanism may be the same mechanism as the electrical connection mechanism.

The electronic component of the attachment element may be any kind of electronic component that may be electrically coupled to the electronic device. Such electronic components may include one or more batteries, connection adapters and/or other cables, storage components, computing components, communication components, global positioning systems, barcode readers, credit card processing units, scanners, printers, displays, speakers, microphones, and/or any other electronic component that may be utilized with the electronic device.

Additionally, the attachment element and/or the electronic device may be coupleable to one or more other electronic devices. Such other electronic devices may be electrically and/or mechanically attachable to the attachment element and/or the electronic device. In cases where the other electronic devices are electrically coupled to one of the attachment element or the electronic device, the electronic device may also be electrically coupled to the other of the attachment element or the electronic device via the directly connected device.

In one or more implementations, a system for connecting electronic devices and attachment elements includes: at least one electronic device including at least one first connection mechanism and at least one attachment element including: at least one second connection mechanism and at least one electronic component; wherein the at least one electronic device and the at least one attachment element are mechanically and electrically attachable by engaging the at least one first connection mechanism with the at least one second connection mechanism such that the at least one electronic device is electrically coupled to the at least one electronic component.

In various implementations, a method for connecting electronic devices and attachment elements includes: engaging a first connection mechanism of at least one electronic device with a second connection mechanism of at least one attachment element; mechanically attaching the at least one electronic device to the at least one attachment element utilizing the first connection mechanism and the second connection mechanism; and electrically connecting the at least one electronic device to the at least one attachment element utilizing the first connection mechanism and the second connection mechanism.

In some implementations, a method for disconnecting electronic devices and attachment elements includes: disengaging a first connection mechanism of at least one electronic device from a second connection mechanism of at least one attachment element; mechanically detaching the at least one electronic device from the at least one attachment element utilizing the first connection mechanism and the second connection mechanism; and electrically disconnecting the at least one electronic device from the at least one attachment element utilizing the first connection mechanism and the second connection mechanism.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1A:
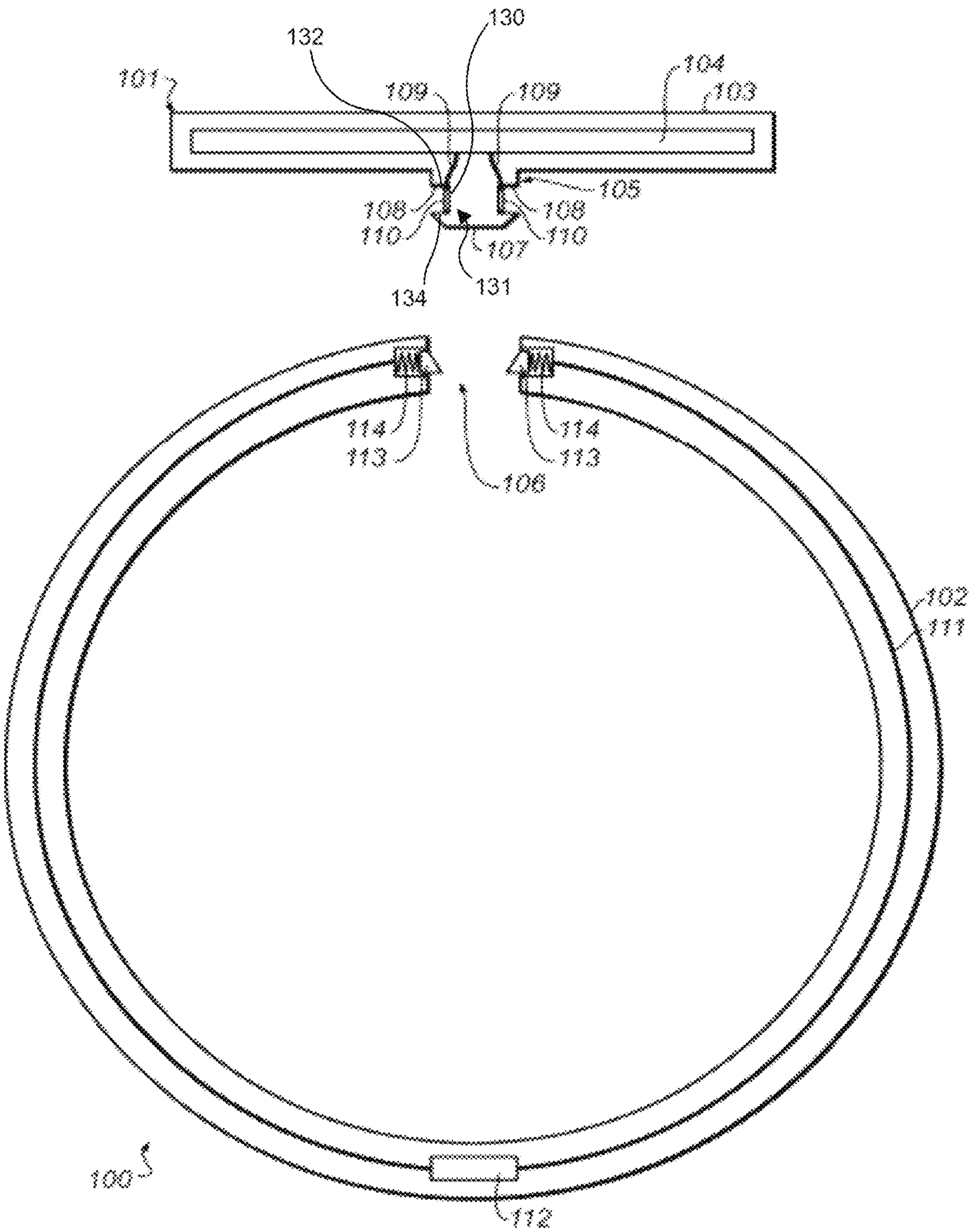
FIG. 1A is a side cross sectional view of a first embodiment of a system for connecting an electronic device to an attachment element utilizing an electromechanical snap connection mechanism.

The description that follows includes sample systems, methods, and computer program products that embody various elements of the present disclosure. However, it should be understood that the described disclosure may be practiced in a variety of forms in addition to those described herein.

The present disclosure discloses systems and methods for electrically and mechanically connecting devices and attachment elements. One or more electronic devices and one or more attachment elements that include one or more electronic components may each include one or more connection mechanisms. The connection mechanisms of the electronic device and the attachment element may be engaged to mechanically and electrically connect the electronic device and the attachment element. Such electrical connection may electrically couple the one or more electrical components of the attachment element to the electronic device.

The electronic device may be any kind of electronic device such as an electronic watch, a laptop computer, a digital media player, a cellular phone, a smart phone, a mobile computing device, a tablet computing device, a pedometer, a heart rate and/or other body status monitor, and/or any other such electronic device. The attachment element may be any kind of attachment element that can couple the electronic device to a body part of a user and/or other object such as one or more bands, straps, and/or other such attachment element.

The connection mechanisms may utilize one or more of a variety of different mechanical connection mechanisms. Such mechanical connection mechanisms may include a variety of different snap mechanisms, twist mechanisms, threaded mechanisms, detest mechanisms, spring mechanisms, slide mechanisms, magnetic mechanisms, and/or any other mechanism for mechanical attachment. The connection mechanisms may also utilize one or more of a variety of different wired and/or wireless electrical connection mechanisms. Such electrical connection mechanism may include one or more electrical contacts and/or any other mechanism for electrical connection. In some cases, the mechanical connection mechanism may be the same mechanism as the electrical connection mechanism.

The electronic component of the attachment element may be any kind of electronic component that may be electrically coupled to the electronic device. Such electronic components may include one or more batteries, connection adapters and/or other cables, storage components, computing components, communication components, global positioning systems, barcode readers, credit card processing units, scanners, printers, displays, speakers, microphones, and/or any other electronic component that may be utilized with the electronic device.

Additionally, the attachment element and/or the electronic device may be coupleable to one or more other electronic devices. Such other electronic devices may be electrically and/or mechanically attachable to the attachment element and/or the electronic device. In cases where the other electronic devices are electrically coupled to one of the attachment element or the electronic device, the electronic device may also be electrically coupled to the other of the attachment element or the electronic device via the directly connected device.

FIG. 1A is a side cross sectional view of a first embodiment of a system 100 for connecting an electronic device 101 to an attachment element 102 utilizing an electromechanical snap connection mechanism 105 and 106.

The system 100 includes an electronic device 101 (which may be any kind of electronic device) and an attachment element 102. As illustrated, the attachment element 102 is a bracelet-style band. However, it is understood that this is an example and that in various implementations the attachment element may be any kind of attachment element.

The electronic device 101 may include a housing 103 and/or one or more electronic components 104. Such electronic components may include one or more processing units, one or more communication components, one or more non-transitory storage media (which may take the form of, but is not limited to, a magnetic storage medium; optical storage medium; magneto-optical storage medium; read only memory; random access memory; erasable programmable memory; flash memory; and so on), and/or any other electronic component. The attachment element 102 may also include one or more electronic components 112, which may be any kind of electronic component such as one or more batteries, connection adapters and/or other cables, storage components, computing components, communication components, global positioning systems, barcode readers, credit card processing units, scanners, printers, displays, speakers, microphones, and/or any other electronic component.

As illustrated, the electronic device 101 may also include conductive elements 109 and a connection mechanism 105. The connection mechanism 105 may include a plug 105 that includes notches 108 and contacts 110. Each notch 108 can be defined by a base portion 130 positioned at a base 131 of notch 108, and overhang portions 132 and 134 extending from base portion 130. The conductive elements 109 may electrically couple the contacts 109 to the electronic component 104.

As also illustrated, the attachment element 102 may also include conductive elements 111 and a connection mechanism 106. The connection mechanism 106 may include spring 104 loaded detents 113. The conductive elements 111 may electrically couple the electronic component 112 to the detents 113.

The electronic device 101 may be attachable to the attachment element 102 by engaging the connection mechanisms 105 and 106. Such connection may mechanically and electrically connect the electronic device 101 and the attachment element 102 and may be accomplished by inserting the connection mechanism 105 into the connection mechanism 106.

Figure 1B:
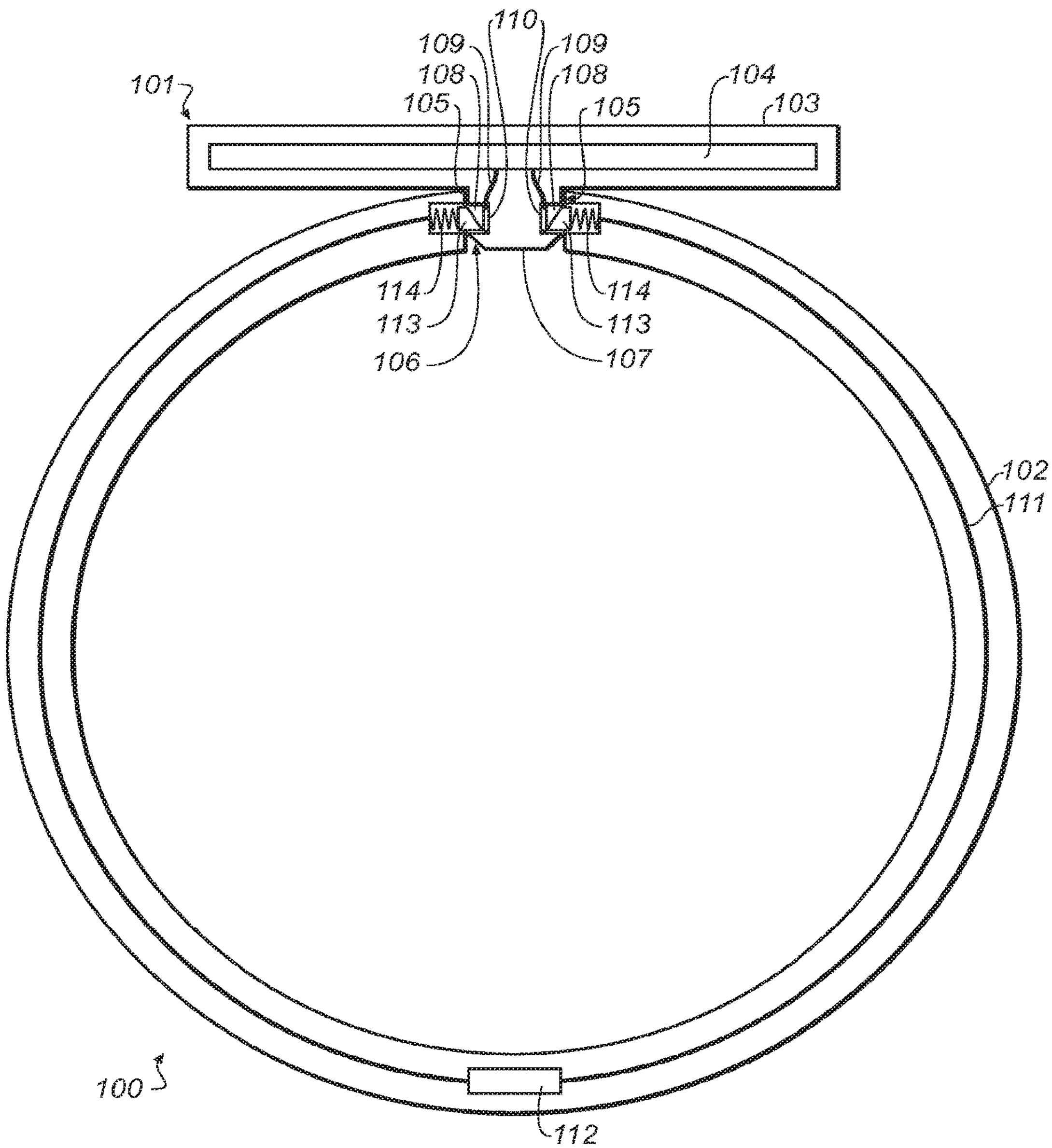
FIG. 1B illustrates the system of FIG. 1A after the electromechanical connection snap mechanism is utilized to mechanically and electrically connect the electronic device to the attachment element.

When the connection mechanism 105 is inserted into the connection mechanism 106, the spring 114 loaded detents 113 may be compressed by the plug 107 until the spring 114 loaded detents 113 are able to enter the notches 108. The spring 114 loaded detents 113 present in the notches 108 may mechanically connect the electronic device 101 to the attachment element 102 until sufficient force is exerted to again compress the springs 114 such that the plug 107 can be removed from the connection mechanism 106. FIG. 1B illustrates the system 100 of FIG. 1A after the electromechanical snap connection mechanism 105 and 106 is utilized to mechanically and electrically connect the electronic device 101 to the attachment element 102.

Additionally, while the spring 114 loaded detents 113 are present in the notches 108, the detents 113 may contact the contacts 110 positioned in base portion 130 at base 131 of notch 108. This may electrically connect the electronic components 112 and 104 via the conductive elements 111 and 109.

Although the connection mechanism 105 is illustrated and described above as including the plug 107, it is understood that this is an example. In various implementations, the connection mechanism 106 may instead include a plug that is inserted into the connection mechanism 105 without departing from the scope of the present disclosure.

Further, though the connection mechanism 105 is illustrated with two notches 108, it is understood that this is an example. In various cases, the connection mechanism 105 may include a variety of notches 108 such that the electronic device 101 may be attached to the attachment element 102 in a variety of different orientations. For example, the electronic device 101 may include a display that has both a landscape and portrait orientation and the connection mechanism 105 may include notches 108 to enable the electronic device to be attached to the attachment element 102 such that either the portrait or landscape orientations of the display are presented to a user when the attachment element 102 is attached to a body part of the user.

Additionally, though the attachment element 102 is illustrated as a bracelet-style band that may enable the electronic device 101 to be attached and/or detached without removing the bracelet-style band, it is understood that this is an example. In various cases, the attachment element 102 may be any kind of attachment element, such as one or more bands, straps, and/or any other attachment element.

In some cases, the attachment element 102 may not include at least one electronic component 112 and may not have any associated functionality. In other cases, the attachment element 102 may include one or more electronic components 112 and may have associated functionality only when electrically and/or mechanically connected to the electronic device 101 (and/or other electronic devices and/or other attachment elements). In still other cases, the attachment element 102 may include one or more electronic components 112 and may have associated functionality regardless whether or not the attachment element 102 is electrically and/or mechanically connected to the electronic device 101 (and/or other electronic devices and/or attachment elements). In such cases, such functionality may alter when the attachment element 102 is electrically and/or mechanically connected to the electronic device 101 (and/or other electronic devices and/or attachment elements).

By way of a first example, the electronic component 112 may be one or more batteries (which may be rechargeable and/or replaceable). Such a battery (which may be a large capacity battery to offer maximum power life for attachment elements 102 designed for multi day travel and/or small capacity batteries in order to result in minimum volume and weight for attachment elements 102 designed for active situations such as an outdoor run) may function to extend a battery life of the electronic device 101 when the attachment element 102 is electrically and/or mechanically connected to the electronic device 101. Additionally, such a battery may function to power various features and/or components of the attachment element 102 regardless whether or not the attachment element 102 is electrically and/or mechanically connected to the electronic device 101, only when the attachment element 102 is electrically and/or mechanically connected to the electronic device 101, only when the attachment element 102 is not electrically and/or mechanically connected to the electronic device 101, and so on.

By way of a second example, the electronic component 112 may be one or more antennas (such as a near field communication antenna, a Bluetooth antenna, a WiFi antenna, and/or other such antenna). Such an antenna may enable the antenna to not have to be included in the electronic device 101, enabling the electronic device 101 to be smaller (since long antennas may be required) and/or made from different materials (since materials such as metals may interfere with antenna communications). In some cases, such antennas may interface with radiofrequency modules included in the electronic device 101, though in other cases such radiofrequency modules may be included in the attachment element 102.

By way of a third example, the electronic component 112 may be one or more global positioning system components or systems. Such a component may provide similar benefits to attachment elements 102 that include antennas. In some cases, the global positioning system may include a storage component (such as flash storage and/or other storage) for storing map data, a travel log, and/or other such data. In various cases, the global positioning system may operate independently of the electronic device 101 such that global positioning system data may be logged until the attachment element 102 is reconnected to the electronic device 101. Such a case may enable a user to go out for a run with the attachment element 102 but not the electronic device 101 but still be able to record the route travelled.

By way of a fourth example, the electronic component 112 may be one or more displays. Such displays may be an E-ink display, an organic light emitting diode display light emitting diode display, and/or other kind of displays or light up indicators. Such a display may be an extension of a display of the electronic device 101 and/or may display particular data (e.g. battery life, local weather, user biometric stats, artwork and/or other aesthetic designs or displays) and may or may not continue to display such data regardless of whether or not the attachment element 102 is electronically and/or mechanically connected to and/or disconnected from the electronic device 101. In some cases, an E-ink display may continue to display an image or design (with or without power) when disconnected from the electronic device 101. In various cases, one or more light emitting diodes may blink or illuminate in other ways to make a user visible in darkness and/or dim illumination.

By way of a fifth example, the electronic component 112 may be one or more microphone and/or speaker combinations. Inclusion of such elements in the attachment element 102 may enable the electronic device 101 to be significantly smaller due to the large back volume that may be required for a speaker. Additionally, the electronic device 101 may be waterproof or water resistant when the attachment element 102 is not electrically and/or mechanically connected as speakers and/or microphones may require one or more acoustic ports to allow sound to travel in and/or out. Moreover, beam-forming microphone configurations may be enabled by spacing multiple microphones on the attachment element 102 at greater distances than may be available in the electronic device 101.

By way of a sixth example, the electronic component 112 may be one or more storage devices, such as data storage devices. Such storage devices may be removable (such as a secure digital card or other removable storage device) and/or fixed. In this way, different attachment elements 102 may contain different data (such as different music playlists, map data, confidential data, and/or other such data). In some cases, attachment elements 102 storing music may be bought as an album and/or a user may store their own music. In various cases, map data may be protected to only work with a particular application or component on the electronic device 101. In one or more cases, confidential data may be unlocked by a password or a biometric signature (such as a fingerprint, photoplethysmographic data, or other biometric). In some cases, personal passwords such as passwords to enter websites, unlock a computer, use near field communication payment, unlock a car or house, and so on) may be stored by an attachment element 102.

By way of a seventh example, the electronic component 112 may be one or more user interface controls. In some cases, an attachment element 102 may extend the input and/or output functionality of the electronic device 101 by offering controls that may not fit and/or may not be included in the electronic device 101. Such controls may be in the form of one or more buttons, capacitive touch sensors, slide switches (such as a ringer switch), force-sensitive pads, and/or any other controls. Functionality of such controls may include volume controls, media controls, starting and/or stopping of data logging (e.g. biometric data, location data, and/or other data), and/or any other user interface functionality.

By way of an eighth example, the electronic component 112 may be one or more sensors. Such sensors may extend electronic device 101 functionality by including specialized sensors not included in the electronic device 101. Examples of such sensors may include one or more inertial sensors, compasses, pressure sensors, biometric sensors, fingerprint readers, thermometers, ultraviolet sensors, cameras, radiation detectors, breathalyzers, and/or any other such sensors. Some sensors, such as thermometers or compasses, may experience improved operation when removed from thermal and/or magnetic sources contained within the electronic device 101. Other sensors (such as photoplethysmographic biometric sensors) may experience improved operation specific placement (e.g. the underside of a user's wrist) which may not be accessible from electronic device 101. In some cases, sensors (e.g. galvanic skin response sensors, electrocardiogram sensors, and/or other such sensors) may be contained within the electronic device 101 and electrodes associated with such may be included in the attachment element 102. Some sensors, such as a camera may be too large to include in the electronic device 101 itself and may thus be located on the attachment element 102. Other sensors, such as a radiation detector or a breathalyzer, may be useful to too few users to justify including in the electronic device 101 and may thus be included in the attachment element 102.

By way of a ninth example, the electronic component 112 may be one or more charging components. Such charging components may extend the battery life of the electronic device 101 and/or the attachment element 102 by including ways to charge the electronic device 101 and/or the attachment element 102 during use. In some implementations, chargers such as solar cells may enable charging via solar energy. In other implementations, chargers such as kinetic chargers may enable charging via movement or vibration. In still other implementations, chargers such as thermal generators (such as a Peltier device) may enable charging via the thermal gradient between one or more parts of a user's body and the ambient temperature.

By way of a tenth example, the attachment element 102 may include one or more non-electrical components. Functionality of such components may not directly interact with the electronic device 101. Examples of such may include a wallet to store money or other items, a pocket to store keys or other items, and so on.

Figure 2A:
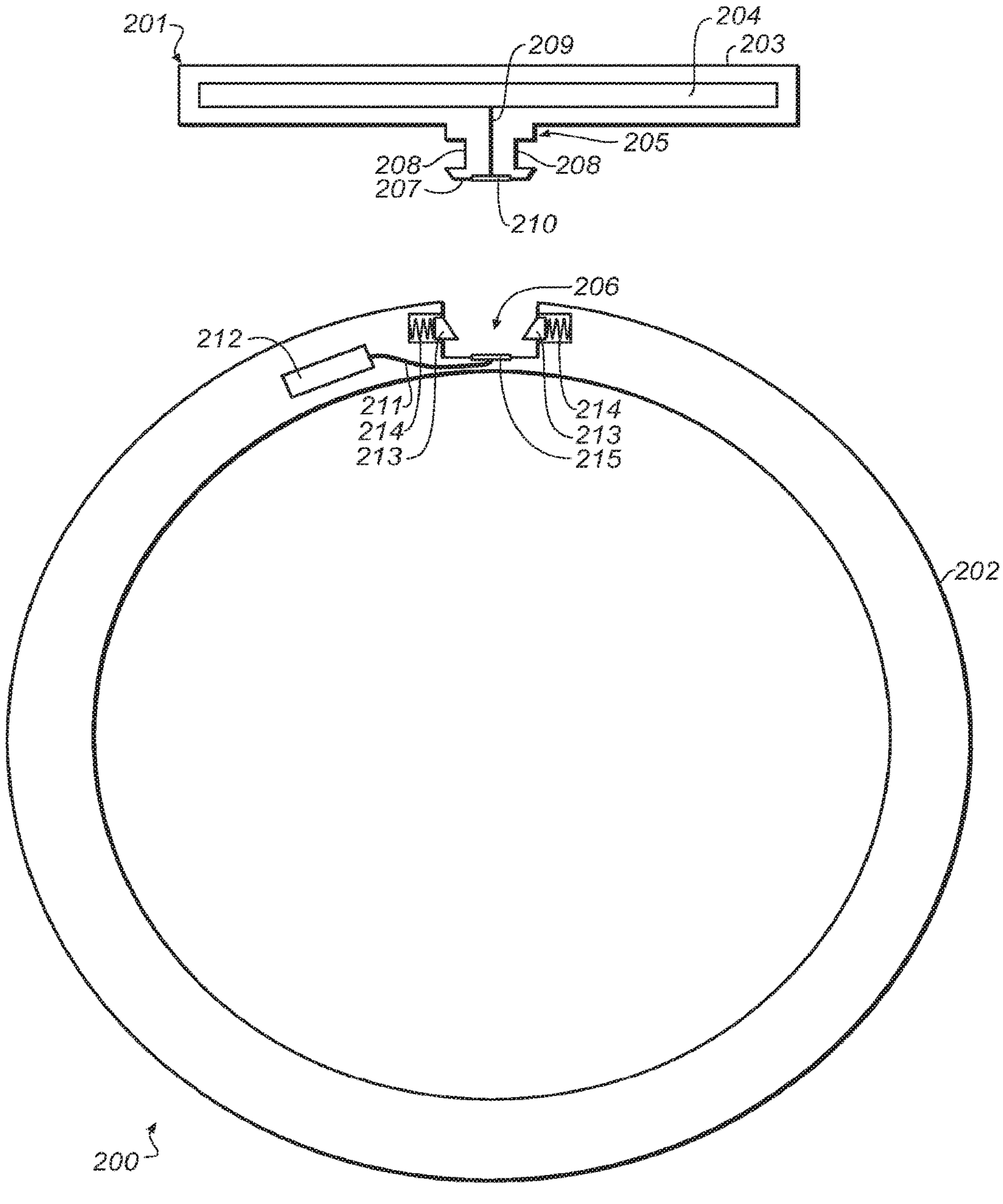
FIG. 2A is a side cross sectional view of a second embodiment of a system connecting an electronic device to an attachment element utilizing an electromechanical snap connection mechanism.

FIG. 2A is a side cross sectional view of a second embodiment of a system 200 for connecting an electronic device 201 to an attachment element 202 utilizing an electromechanical snap connection mechanism 205 and 206.

The system 200 includes an electronic device 201 and an attachment element 202. The electronic device 201 may include a housing 203, one or more electronic components 204, a conductive element 209, and a connection mechanism 205 that includes a plug 207, notches 208, and a contact 210. The attachment element 202 may include a conductive element 211, one or more electronic components 212, and a connection mechanism 206 that includes a contact 215 and spring 214 loaded detents 213.

The system 200 may be similar to the system 100 of FIG. 1A except that the connection mechanism 206 does not extend all the way through the attachment element 202 and the electrical connection between the electrical component 204 and the electrical component 212 may be formed by connection between the contacts 210 and 215 instead of the spring 214 loaded detents 213.

Figure 2B:
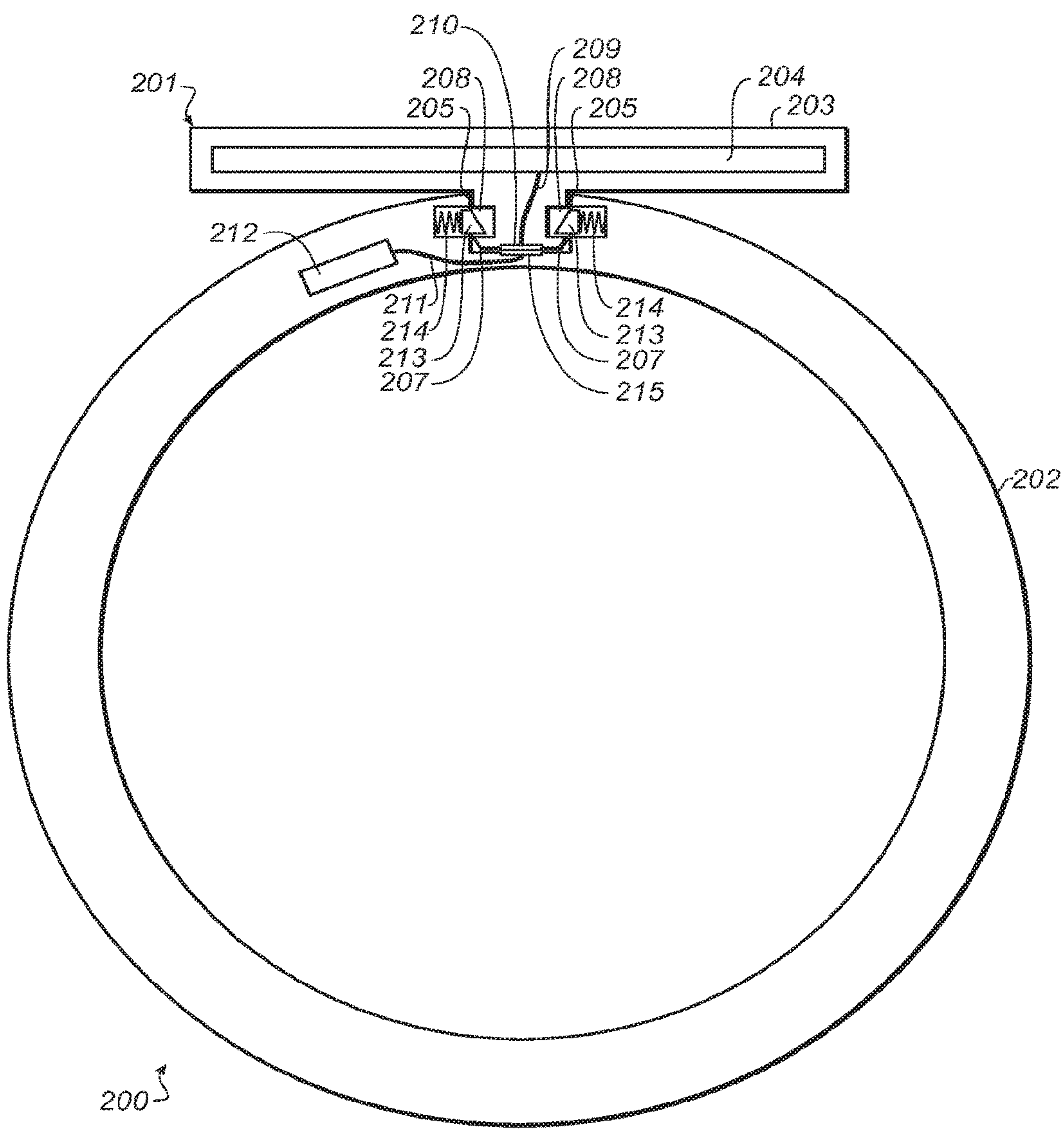
FIG. 2B illustrates the system of FIG. 2A after the electromechanical connection snap mechanism is utilized to mechanically and electrically connect the electronic device to the attachment element.

FIG. 2B illustrates the system 200 of FIG. 2A after the electromechanical snap connection mechanism 205 and 206 is utilized to mechanically and electrically connect the electronic device 201 to the attachment element 202.

Though the attachment element 202 is illustrated as an unbroken band, it is understood that this is an example. In various implementations, such a band may include one or more portions that may be connected by one or more connector mechanisms such as one or more buckles, snaps, magnets, and/or other such connector mechanisms without departing from the scope of the present disclosure.

Further, though the connection mechanism 205 is illustrated and described as having a single contact 210 and the connection mechanism 206 is illustrated and described as having a single contact 215, it is understood that the connection mechanism 205 and/or the connection mechanism 206 may have any number of contacts 210 and 215 (such as one, four, or fifteen) without departing from the scope of the present disclosure.

Figure 3A:
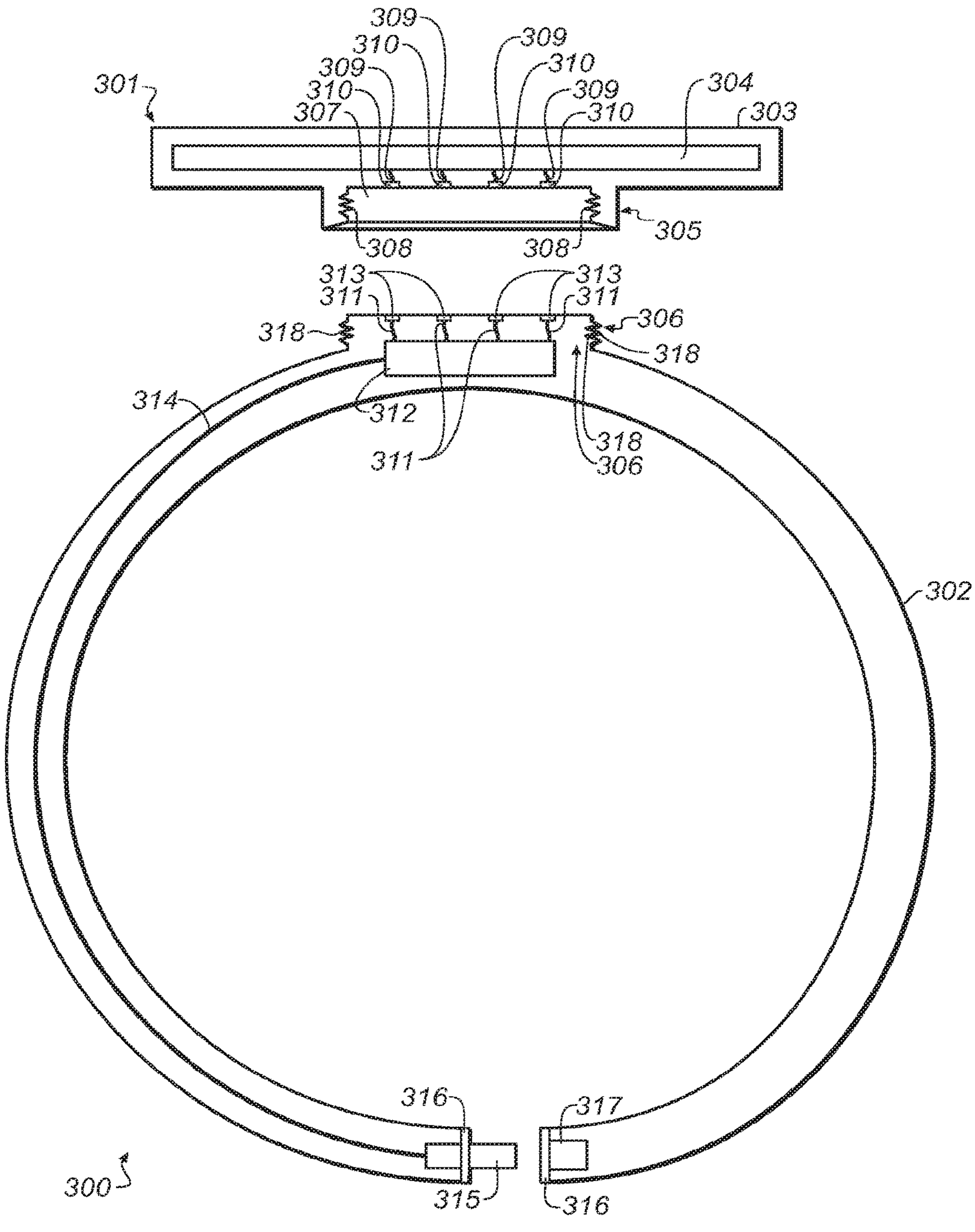
FIG. 3A is a side cross sectional view of a third embodiment of a system for connecting an electronic device to an attachment element utilizing an electromechanical threaded twist connection mechanism.

FIG. 3A is a side cross sectional view of a third embodiment of a system 300 for connecting an electronic device 301 to an attachment element 302 utilizing an electromechanical threaded twist connection mechanism 305 and 306.

The system 300 includes an electronic device 301 and an attachment element 302. The electronic device 301 may include a housing 303, one or more electronic components 304, conductive elements 309, and a connection mechanism 305 that includes threads 308 and contacts 310. The attachment element 302 may include conductive elements 311, one or more electronic components 312, and a connection mechanism 306 that includes contacts 315 and threads 318.

As contrasted with the system 200 of FIG. 2A, the connection mechanism 305 may be connected to the connection mechanism 306 by engaging the threads 308 with the threads 318. This may enable the electronic device 301 to "screw" onto the attachment element 302 and may cause the contacts 310 to contact the contacts 315.

Figure 3B:
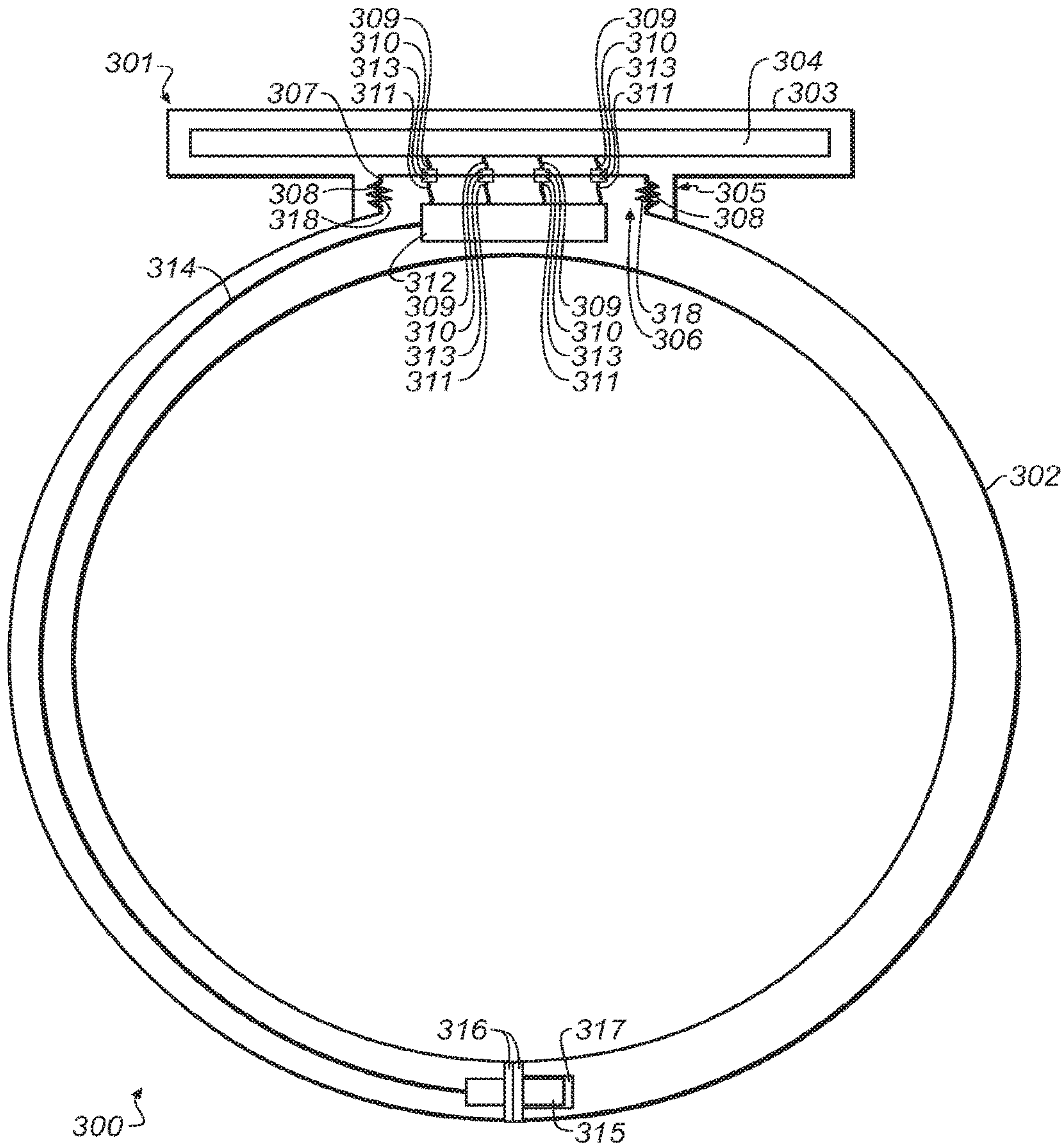
FIG. 3B illustrates the system of FIG. 3A after the electromechanical threaded twist connection mechanism is utilized to mechanically and electrically connect the electronic device to the attachment element.

FIG. 3B illustrates the system 300 of FIG. 3A after the electromechanical threaded twist connection mechanism 305 and 306 is utilized to mechanically and electrically connect the electronic device 301 to the attachment element 302.

Further, with reference again to FIG. 3A, the attachment element 302 may include a connector 315 that is electrically coupled to the electronic component 312 via a conductive element 314. The connector 315 may be any kind of a connector such as a universal serial bus connector and/or any other kind of connector. Such a connector 315 may be coupleable to one or more other electronic devices (such as a computing device, a power source, and so on) to the electrical component 312 for purposes of electrical connection, communication connection, charging, and so on. Further, by connecting the electric component 312 to the other electronic device, the connector 315 may be operable to indirectly connect the electronic device 301 to the other electronic device.

As illustrated, the connector 315 may be located at a gap in the attachment element 302 that includes connection mechanisms 316 and 317 and an aperture 317. These elements may enable the connector 315 to be inserted into the aperture 317 and the gap to be closed by the connection of the connection mechanisms 316 and 317. As also illustrated, the connection mechanisms 316 and 317 may be magnetic elements that each include one or more polarity portions (which may be dynamically controllable). The magnetic elements of the connection mechanisms 316 and 317 may be configured such that the connection mechanisms 316 and 317 attract, allowing the illustrated gap to be releasably sealed (as illustrated in FIG. 3B).

Figure 4A:
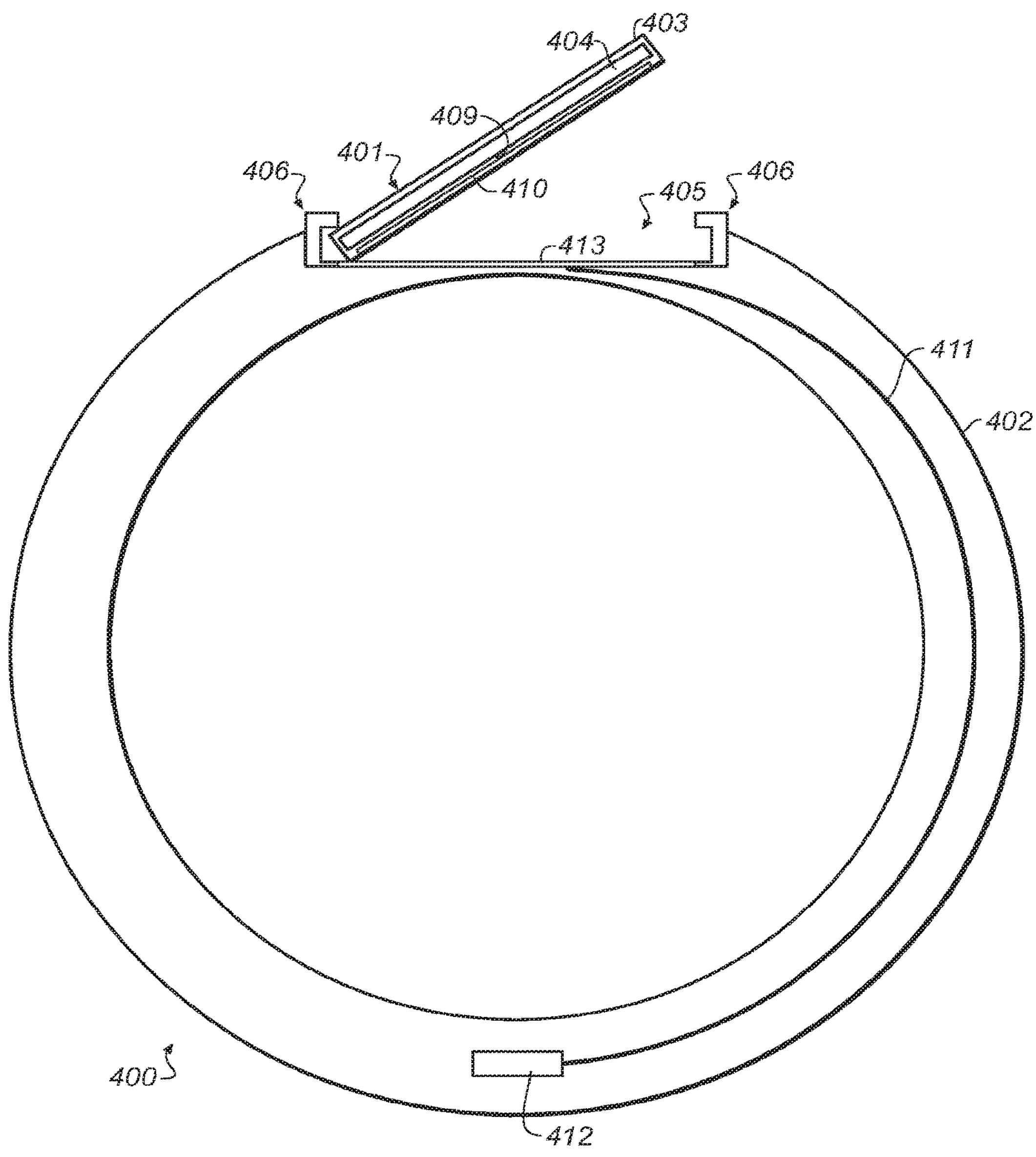
FIG. 4A is a side cross sectional view of a fourth embodiment of a system connecting an electronic device to an attachment element utilizing an electromechanical toe-in snap connection mechanism.

FIG. 4A is a side cross sectional view of a fourth embodiment of a system 400 for connecting an electronic device 401 to an attachment element 402 utilizing an electromechanical toe-in snap connection mechanism 405.

The system 400 includes an electronic device 401 and an attachment element 402. The electronic device 401 may include a housing 403, one or more electronic components 404, a conductive element 409, and contact 410. The attachment element 402 may include a conductive element 411, one or more electronic components 412, and a connection mechanism 405 that includes prongs 406.

As contrasted with the system 300 of FIG. 3A, the connection mechanism 405 may be connected to the electronic device 401 itself by sliding one edge of the electronic device 401 under one of the prongs 406 and snapping the other edge of the electronic device 401 under the other of the prongs 406. In this case, the electronic device 401 itself may be the connection mechanism of the electronic device 401 as the prongs 406 mechanically connect the electronic device 401 to the attachment element 402 by restraining the entire electronic device 401.

Figure 4B:
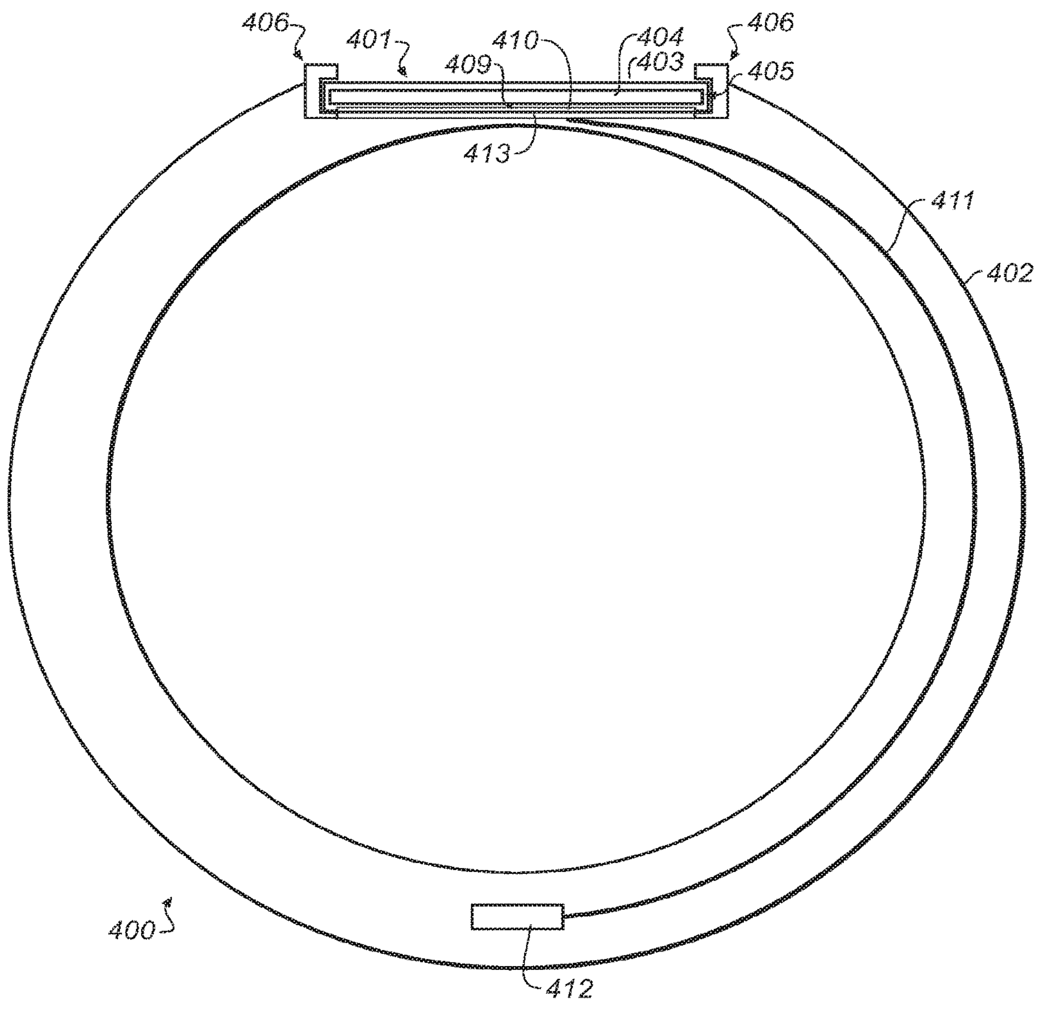
FIG. 4B illustrates the system of FIG. 4A after the electromechanical toe-in snap connection mechanism is utilized to mechanically and electrically connect the electronic device to the attachment element.

FIG. 4B illustrates the system 400 of FIG. 4A after the electromechanical toe-in snap connection mechanism 405 is utilized to mechanically and electrically connect the electronic device 401 to the attachment element 402. As illustrated, after connection, the contact 410 may contact the contact 413.

Although the system 400 is illustrated and described as snapping at least part of the electronic device 401 into the connection mechanism 405 of the attachment element 402, it is understood that this is an example. In various cases, at least a portion of the attachment element 402 may snap into a connection mechanism of the electronic device 401 without departing from the scope of the present disclosure.

Figure 5A:
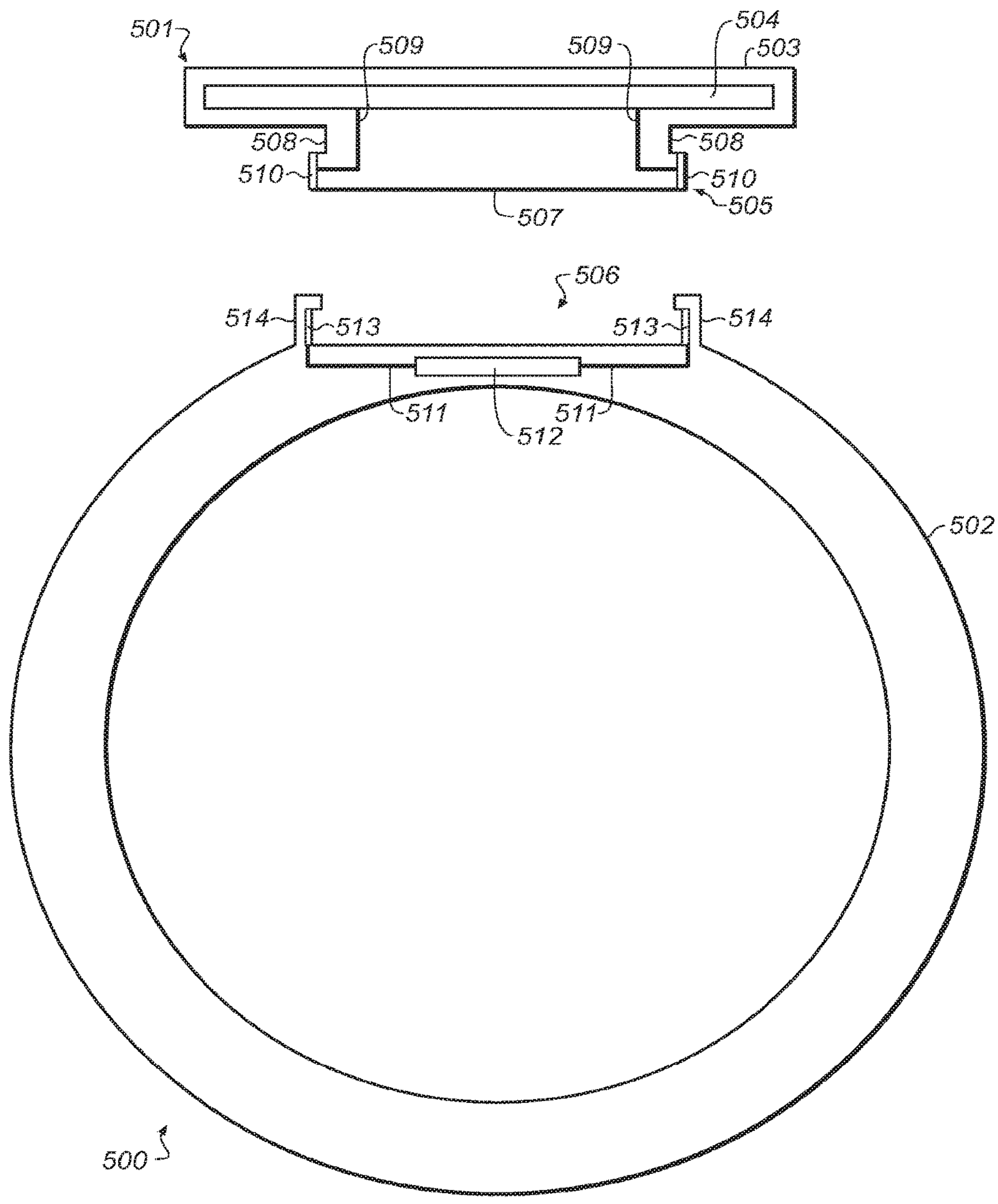
FIG. 5A is a side cross sectional view of a fifth embodiment of a system for connecting an electronic device to an attachment element utilizing an electromechanical snap connection mechanism.

FIG. 5A is a side cross sectional view of a fifth embodiment of a system 500 for connecting an electronic device 501 to an attachment element 502 utilizing an electromechanical snap connection mechanism 505 and 506.

The system 500 includes an electronic device 501 and an attachment element 502. The electronic device 501 may include a housing 503, one or more electronic components 504, conductive elements 509, and a connection mechanism 505 that includes a plug 507, apertures 508, and contacts 510. The attachment element 502 may include a conductive element 511, one or more electronic components 512, and a connection mechanism 506 that includes prongs 514 with contacts 513.

As contrasted with the system 400 of FIG. 4A, the connection mechanism 505 may be connected to the connection mechanism 506 by pressing the plug 507 down to pry open the prongs 514. The prongs 514 may then enter the apertures 508 such that the contacts 510 contact the contacts 513.

Figure 5B:
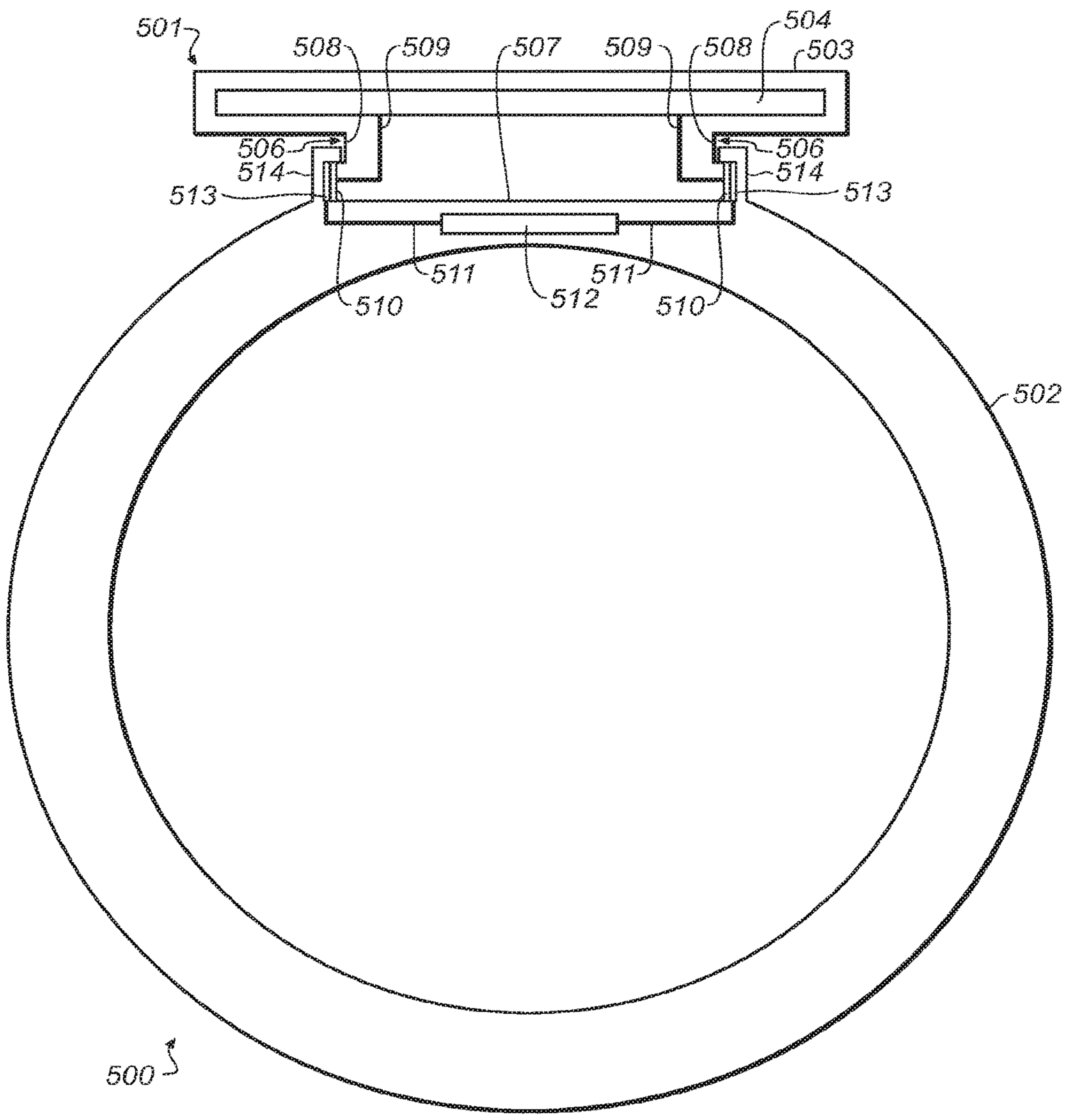
FIG. 5B illustrates the system of FIG. 5A after the electromechanical snap connection mechanism is utilized to mechanically and electrically connect the electronic device to the attachment element.

FIG. 5B illustrates the system 500 of FIG. 5A after the electromechanical snap connection mechanism 505 and 506 is utilized to mechanically and electrically connect the electronic device 501 to the attachment element 502.

Although the system 500 is illustrated and described as snapping a plug 507 of the connection mechanism 505 using prongs 514 of the connection mechanism 506, it is understood that this is an example. In various cases, the attachment element 502 may include a plug and the electronic device 601 may include prongs without departing from the scope of the present disclosure.

Figure 6A:
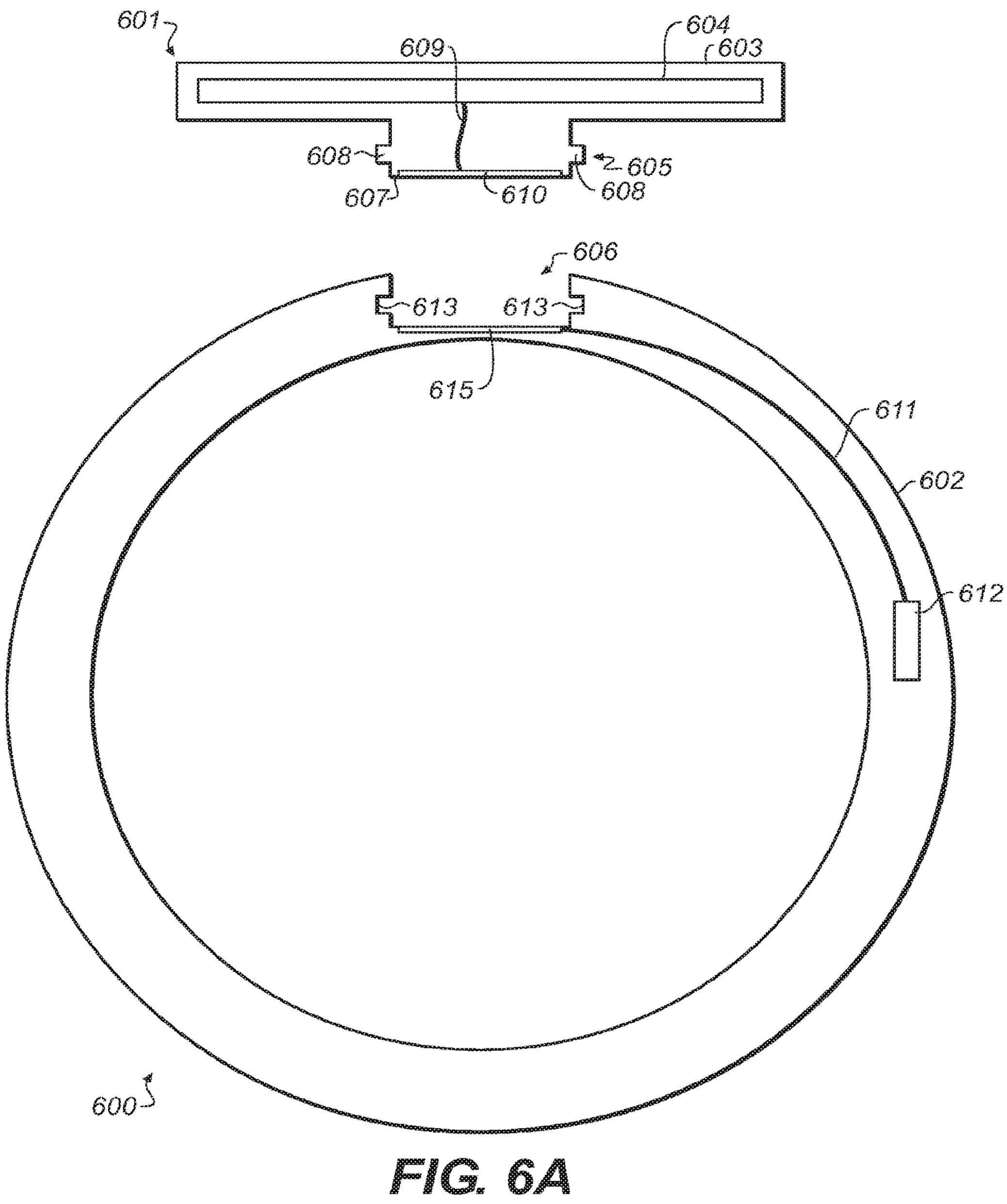
FIG. 6A is a side cross sectional view of a sixth embodiment of a system for connecting an electronic device to an attachment element utilizing an electromechanical twist connection mechanism.

FIG. 6A is a side cross sectional view of a sixth embodiment of a system 600 for connecting an electronic device 601 to an attachment element 602 utilizing an electromechanical twist connection mechanism 605 and 606.

The system 600 includes an electronic device 601 and an attachment element 602. The electronic device 601 may include a housing 603, one or more electronic components 604, a conductive element 609, and a connection mechanism 605 that includes a plug 607, pins 608, and a contact 610. The attachment element 602 may include a conductive element 611, one or more electronic components 612, and a connection mechanism 606 that includes a track 613 and a contact 615.

Figure 6B:
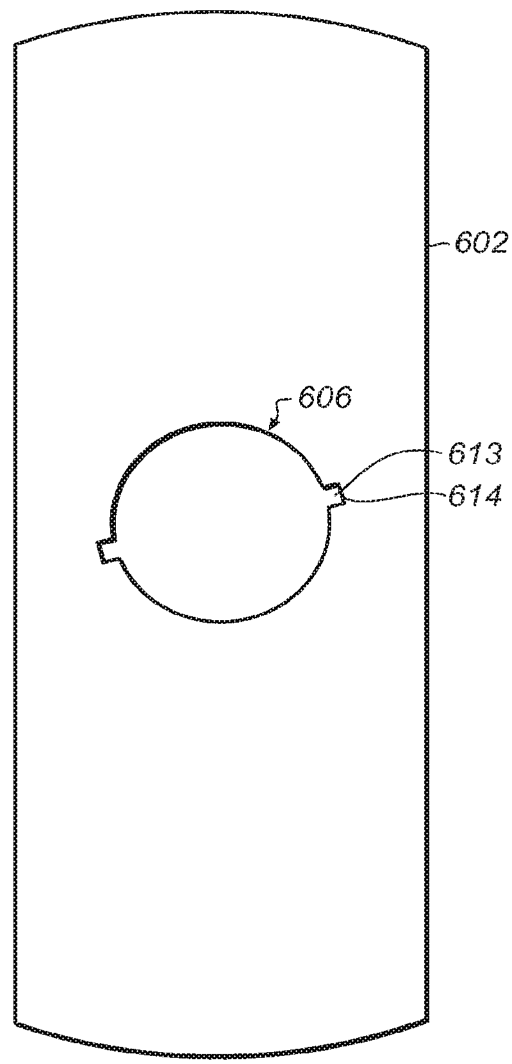
FIG. 6B is a top view of the attachment element of FIG. 6A.
Figure 6C:
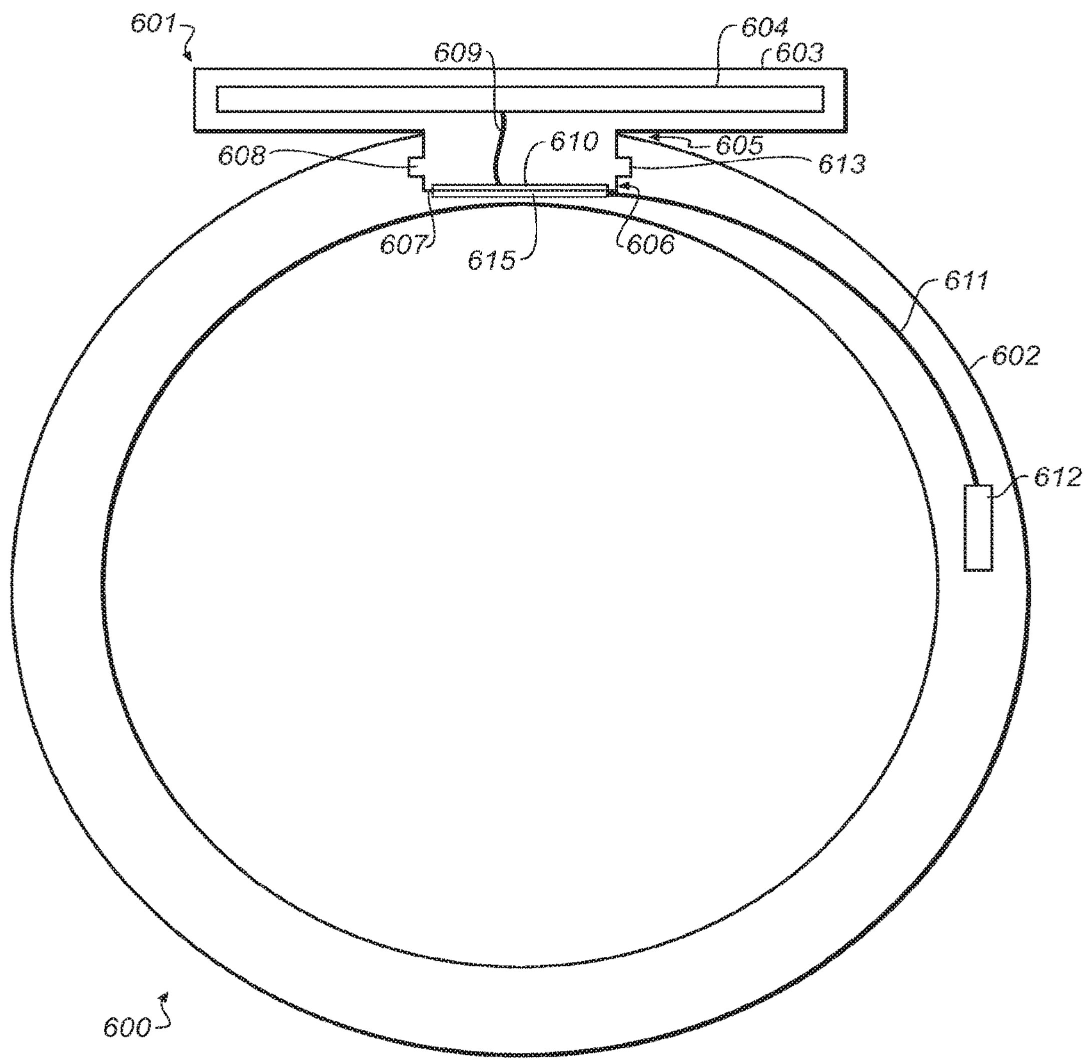
FIG. 6C illustrates the system of FIG. 6A after the electromechanical twist connection mechanism is utilized to mechanically and electrically connect the electronic device to the attachment element.

As contrasted with the system 500 of FIG. 5A, with reference to FIG. 6B, the attachment element 602 may include aperture 614 that enable the pins 608 to be inserted into the track 613. With reference to FIG. 6C, the pins 608 may then be moved along the track 613 away from the apertures 614, mechanically connecting the connection mechanism 606 to the connection mechanism 605 may be connected to the connection mechanism 606. This may cause the contact 610 to contact the contact 615.

As the pins 608 have moved along the track 613 away from the apertures 614, the pins 608 may not be able to leave the track 613 unless the pins 608 are moved back along the track 613 to the apertures 614, in this way, the electronic device 601 may be mechanically and electrically connected to the attachment element 602.

Although the system 600 is illustrated and described the connection mechanism 605 including the pins 608 and the connection mechanism 606 including the track 613 and the apertures 614, it is understood that this is an example. In various cases, the attachment element 602 may include pins and the electronic device 601 may include one or more tracks and/or apertures without departing from the scope of the present disclosure.

Figure 7A:
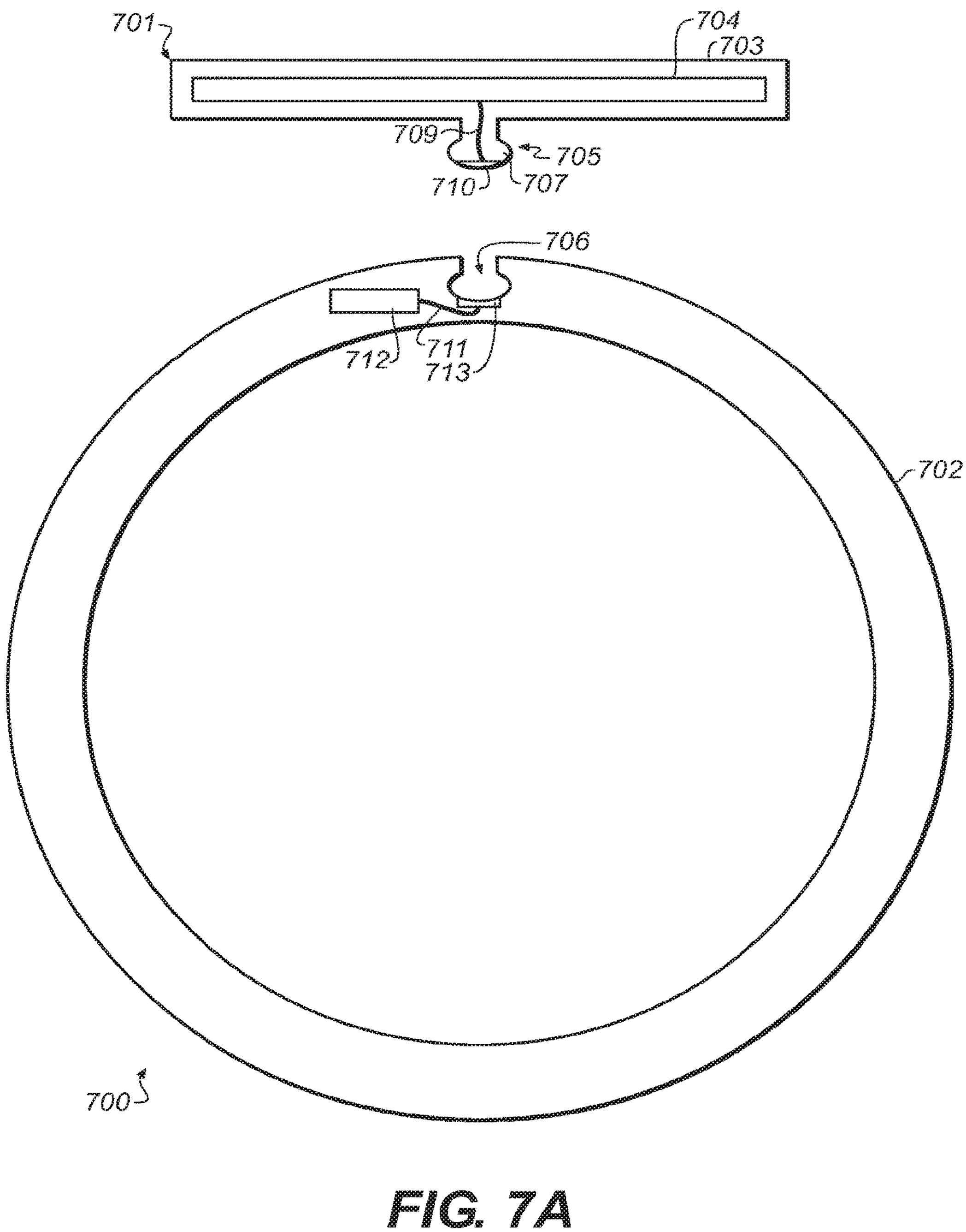
FIG. 7A is a side cross sectional view of a seventh embodiment of a system for connecting an electronic device to an attachment element utilizing an electromechanical slide connection mechanism.

FIG. 7A is a side cross sectional view of a seventh embodiment of a system 700 for connecting an electronic device 701 to an attachment element 702 utilizing an electromechanical slide connection mechanism 705 and 706.

The system 700 includes an electronic device 701 and an attachment element 702. The electronic device 701 may include a housing 703, one or more electronic components 704, a conductive element 709, and a connection mechanism 705 that includes a plug 707 and a contact 710. The attachment element 702 may include a conductive element 711, one or more electronic components 712, and a connection mechanism 706 that includes a contact 713.

Figure 7B:
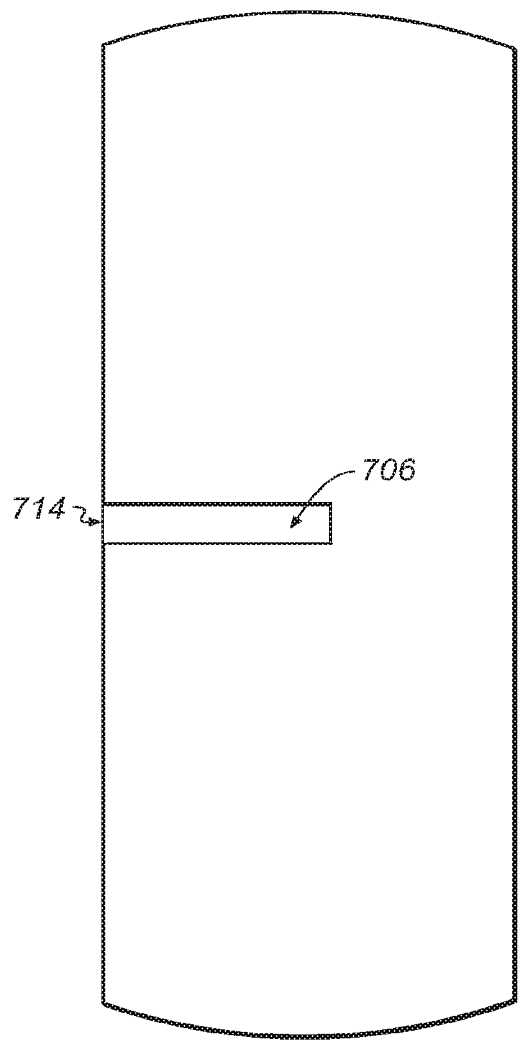
FIG. 7B is a top view of the attachment element of FIG. 7A.
Figure 7C:
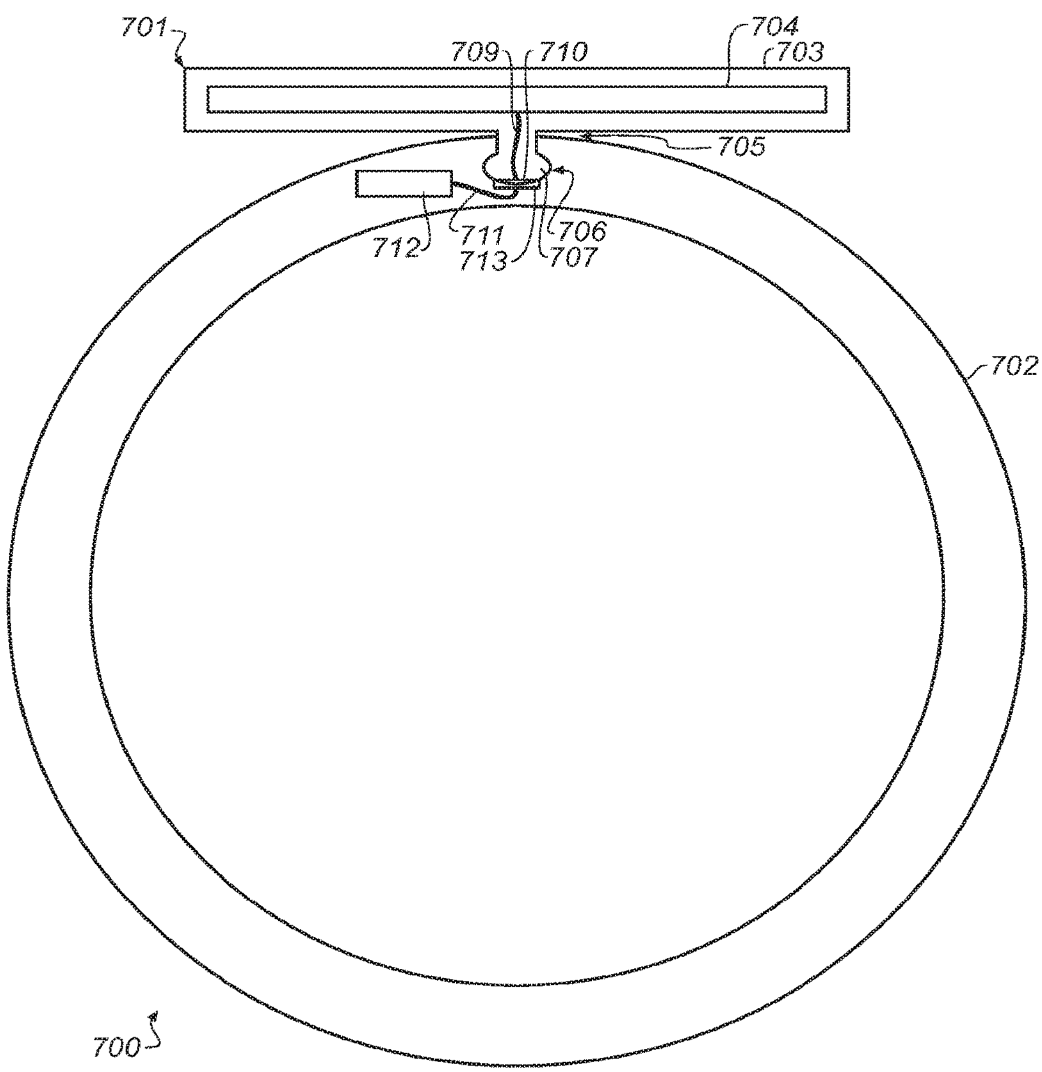
FIG. 7C illustrates the system of FIG. 7A after the electromechanical slide connection mechanism is utilized to mechanically and electrically connect the electronic device to the attachment element.

As contrasted with the system 600 of FIG. 6A, with reference to FIG. 7B, the attachment element 702 may include aperture 714 that enable the plug 707 to be inserted by sliding or similar motion into the connection mechanism 706 from the side. With reference to FIG. 7C, the plug 707 may then be moved into the connection mechanism 706. This may cause the contact 710 to contact the contact 713. As the plug 707 occupies the connection mechanism 706, the electronic device 701 may be mechanically and electrically connected to the attachment element 702 until the plug 707 is slid back out of the connection mechanism 706.

Although the system 700 is illustrated and described the connection mechanism 705 including the plug 707 that can be slid into the connection mechanism 706, it is understood that this is an example. In various cases, the attachment element 702 may include a plug that may be slid into the connection mechanism 705 without departing from the scope of the present disclosure.

Figure 8A:
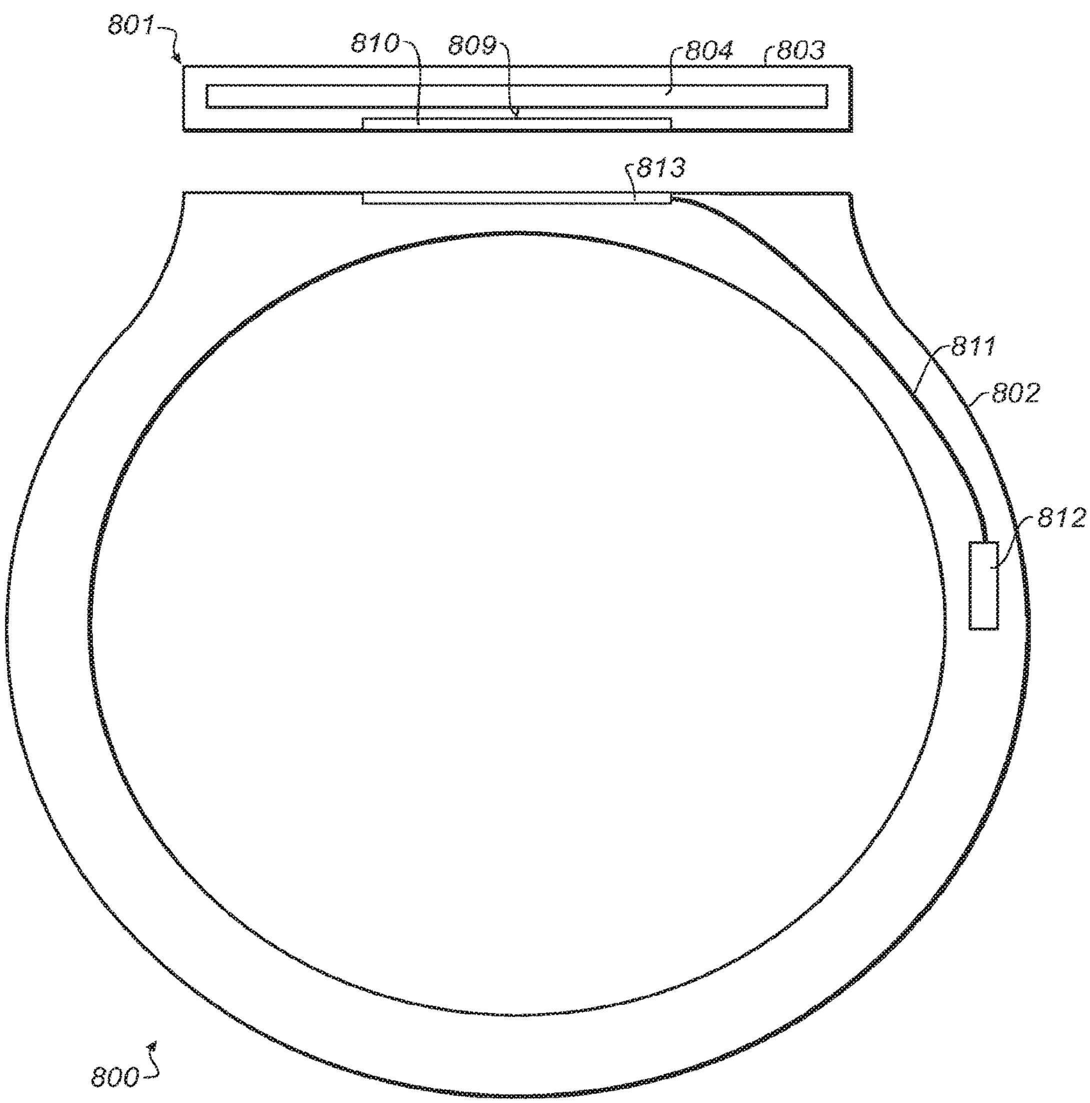
FIG. 8A is a side cross sectional view of an eighth embodiment of a system for connecting an electronic device to an attachment element utilizing an electromechanical magnetic connection mechanism.

FIG. 8A is a side cross sectional view of an eighth embodiment of a system 800 for connecting an electronic device 801 to an attachment element 802 utilizing an electromechanical magnetic connection mechanism.

The system 800 includes an electronic device 801 and an attachment element 802. The electronic device 801 may include a housing 803, one or more electronic components 804, a conductive element 809, and a magnetic contact element 810. The attachment element 802 may include a conductive element 811, one or more electronic components 812, and a magnetic contact element 813.

As contrasted with the system 700 of FIG. 7A, the magnetic contact elements 810 and 813 may each include one or more polarized portions and one or more electrical contact portions. The polarized portions (which may be dynamically controllable) of the magnetic contact elements 810 and 813 may be configured to oppose such that the magnetic contact elements 810 and 813 attract each other. When this attraction causes the magnetic contact elements 810 and 813 to contact, the respective electrical contact portions may contact such that the electrical device 801 and the attachment element 802 are electrically and mechanically connected. In this way, the magnetic contact elements 810 and 813 may simultaneously be mechanical and electrical connection mechanisms.

Figure 8B:
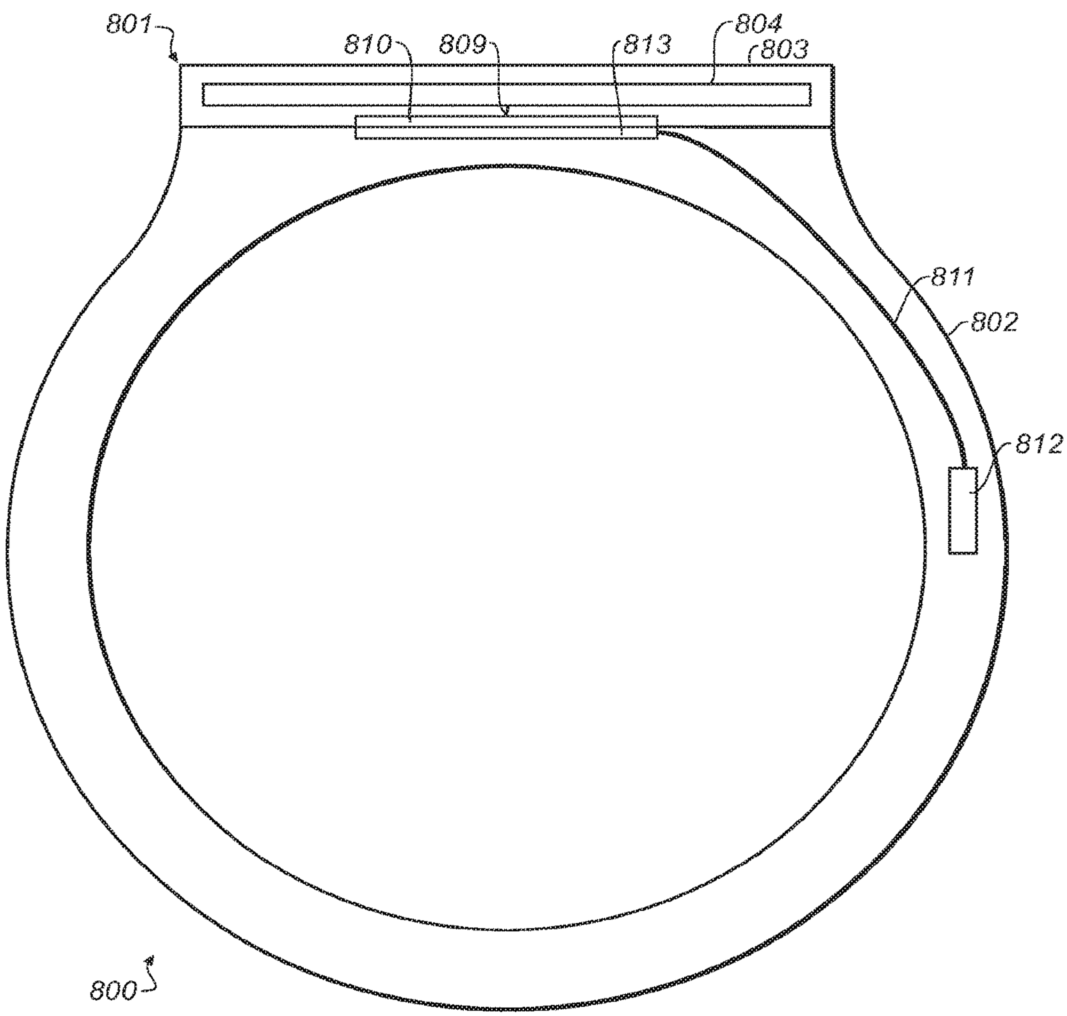
FIG. 8B illustrates the system of FIG. 8A after the electromechanical magnetic connection mechanism is utilized to mechanically and electrically connect the electronic device to the attachment element.

FIG. 8B illustrates the system 800 of FIG. 8A after the electromechanical magnetic connection mechanism of the magnetic contact elements 810 and 813 is utilized to mechanically and electrically connect the electronic device 801 to the attachment element 802.

Figure 8C:
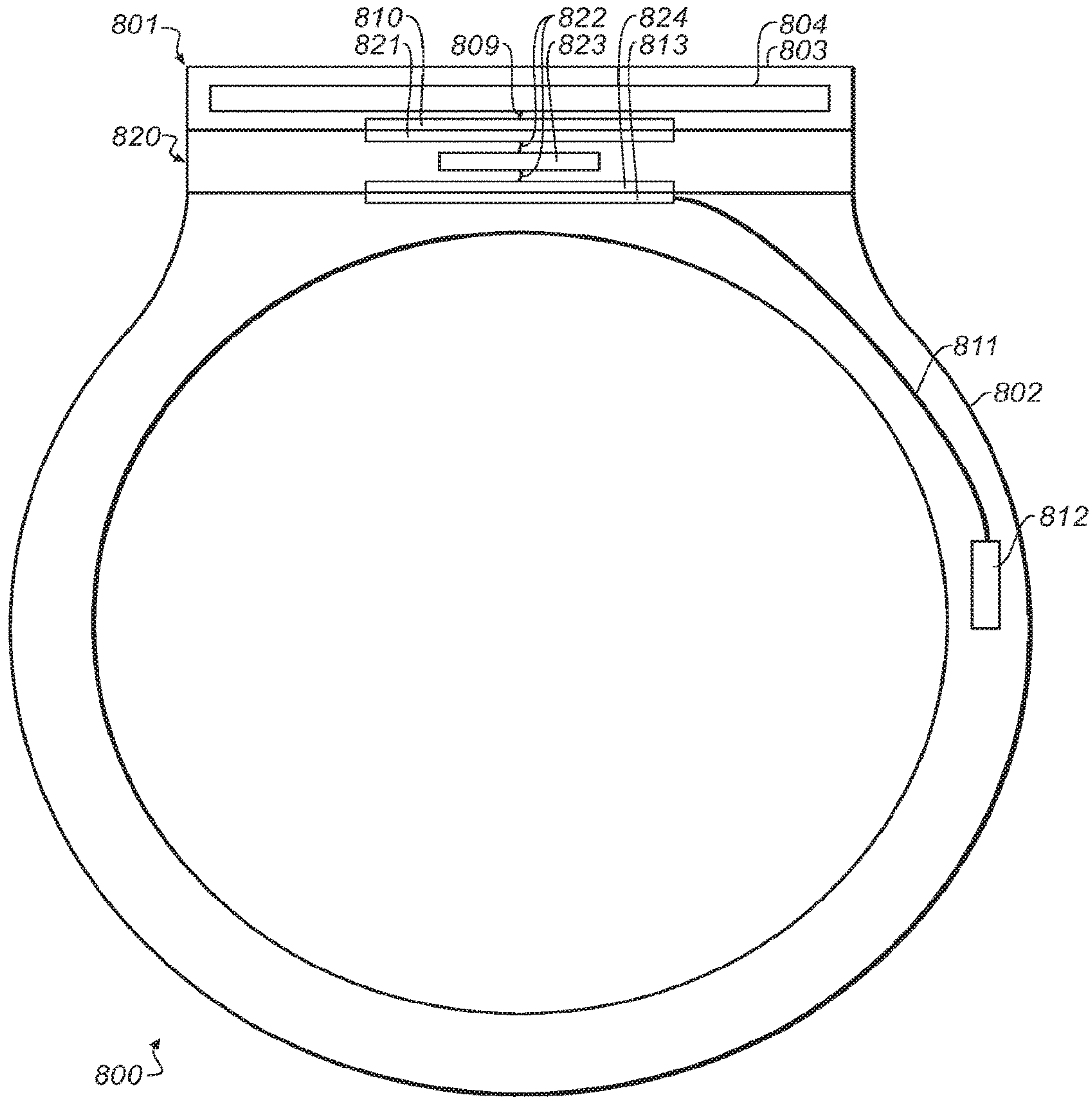
FIG. 8C illustrates the system of FIG. 8A after the electromechanical magnetic connection mechanism is utilized to mechanically and electrically connect the electronic device to the attachment element by connecting the attachment element and the electronic device to an intermediate electronic device.

As illustrated in FIG. 8C, the electronic device 801 and the attachment element 802 may be indirectly connected mechanically and electrically by one or more intermediate electronic devices 820. Such an intermediate electronic device may be any electronic device that includes at least one electrical component 823, conductive elements 822, and first and second magnetic contact elements 821 and 824.

As illustrated, the electronic device 801 and the attachment element 802 may be indirectly connected mechanically and electrically by the intermediate electronic devices 820 by the magnetic contact element 810 mechanically and electrically coupling to the first magnetic contact element 821 and the magnetic contact element 813 mechanically and electrically coupling to the second magnetic contact element 824. In this way, the electrical and mechanical connection between the electronic device 801 and the attachment element 802 may be formed via one or more modular components.

Although the system 800 is illustrated and described as including a single set of magnetic contact elements 810 and 813, it is understood that this is an example. In various cases, the any number of magnetic contact elements may be utilized without departing from the scope of the present disclosure.

Further, although the system 800 is illustrated and described with respect to FIG. 8C as including a single intermediate component 820, it is understood that this is an example. In various cases, any number of intermediate components may be utilized without departing from the scope of the present disclosure.

Figure 9A:
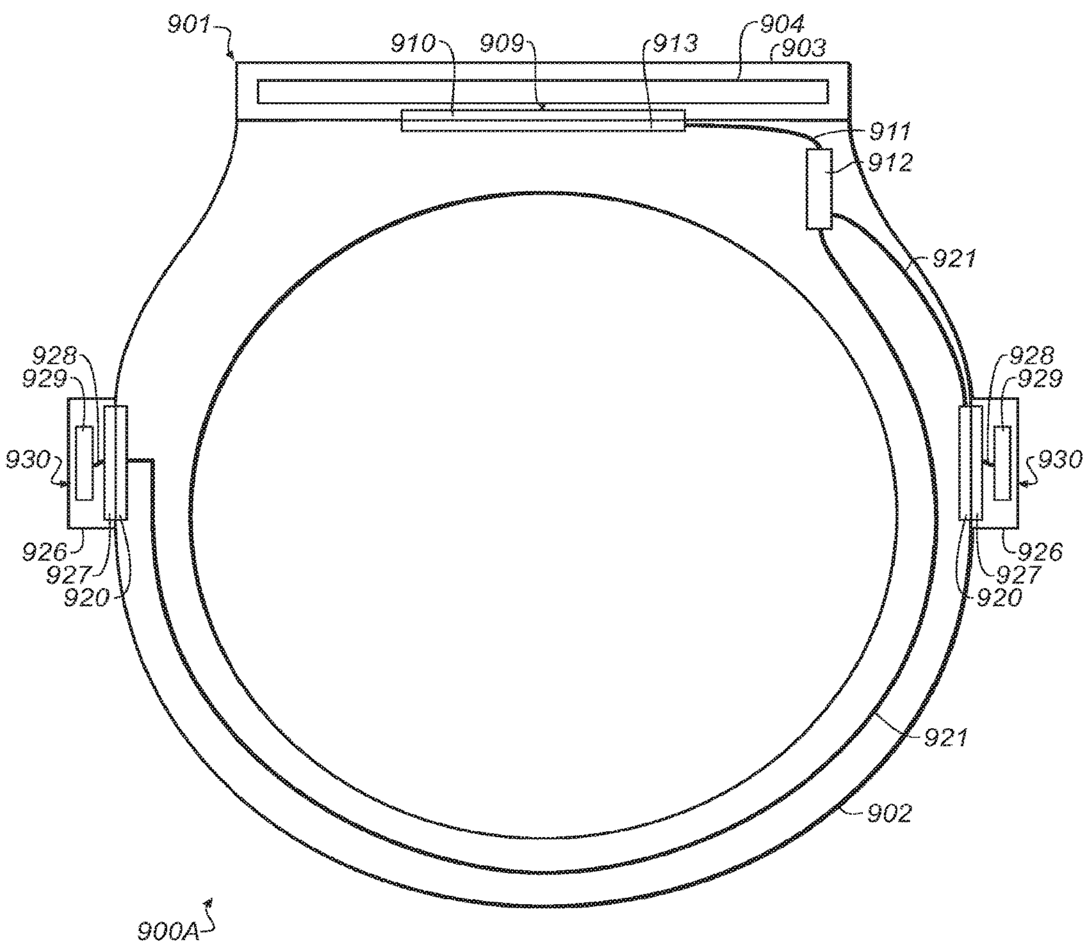
FIG. 9A is a side cross sectional view of an ninth embodiment of a system for connecting an electronic device to an attachment element utilizing an electromechanical magnetic connection mechanism.

FIG. 9A is a side cross sectional view of a ninth embodiment of a system 900A for connecting an electronic device 901 to an attachment element 902 utilizing an electromechanical magnetic connection mechanism.

Similar to the system 800 of FIG. 8A, the system 900A includes an electronic device 901 and an attachment element 902. The electronic device 901 may include a housing 903, one or more electronic components 904, a conductive element 909, and a magnetic contact element 910. The attachment element 902 may include a conductive element 911, one or more electronic components 912, and a magnetic contact element 913.

As contrasted with the system 800 of FIG. 8A, the attachment element 902 may include one or more additional magnetic contact elements 920 that may electrically and/or mechanically connect the attachment element 802 to one or more additional electronic devices 930. Such additional electronic devices 930 may include a housing 926, one or more electronic components 929, a conductive portion 928, and a magnetic contact 927.

Although the system 900A is illustrated and described as having two additional magnetic contact elements 920, it is understood that this is an example. In various cases, the attachment element may include any number of additional magnetic contact elements 920 such as one, three, or thirty) without departing from the scope of the present disclosure.

Further, although the magnetic contact elements 920 are illustrated and described as magnetic contact elements, it is understood that this is an example. In various cases, any mechanical and/or electrical connection mechanism may be utilized to connect additional electronic devices to the attachment element 902.

Figure 9B:
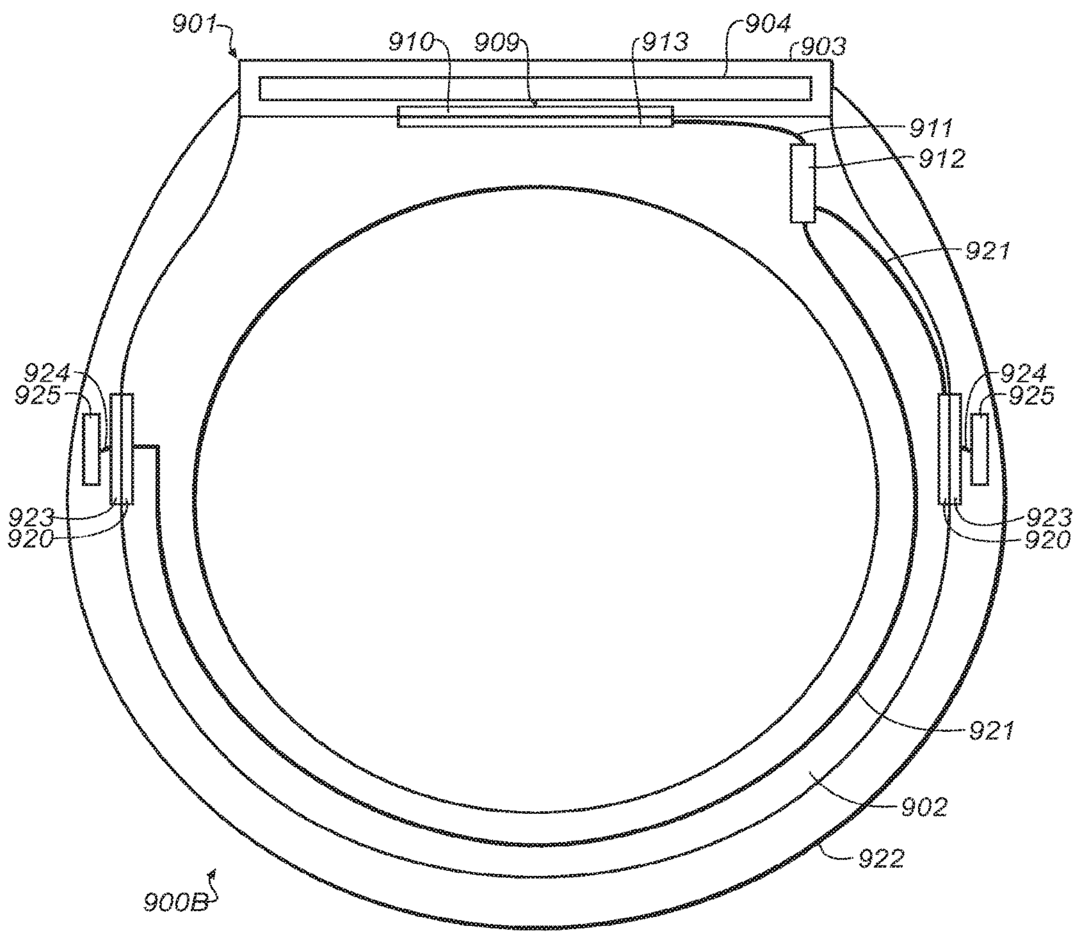
FIG. 9B is a side cross sectional view of a first alternative version of the ninth embodiment of the system of FIG. 9A.

FIG. 9B is a side cross sectional view of a first alternative version 900B of the ninth embodiment of the system 900A of FIG. 9A. Instead of additional electronic devices 930, one or more magnetic contact elements 920 may be utilized to mechanically and/or electrically connect one or more additional attachment elements 922 (which may be made of hard, form-fitting materials, soft materials such as rubber, and/or any other such materials) to the attachment element 902. Such additional attachment elements 922 may include one or more electronic components 925, a conductive element 924, and a magnetic contact element 923.

Further, although the additional attachment element 922 is illustrated and described as having magnetic contact elements 923 for electrically and/or mechanically connecting to the attachment element 902, it is understood that this is an example. In various cases, additional attachment elements 922 may each have additional connection mechanisms for electrically and/or mechanically connecting to one or more additional connection mechanisms and/or additional electronic components. In such cases, attachment mechanisms and/or electronic devices may be stacked in sequence and may be electrically and/or mechanically connected to additional attachment elements 922.

Additionally, although the additional attachment element 922 is illustrated and described as having magnetic contact elements 923 for electrically and/or mechanically connecting to the attachment element 902 and the attachment element 902 is illustrated and described as having magnetic contact elements 920 for electrically and/or mechanically connecting to the attachment element 902, it is understood that this is an example. In various cases, additional attachment elements 920 and/or attachment element 902 may each have various connection mechanisms for electrically (such as via electrical copper, copper and/or other contacts, wirelessly such as via Bluetooth or other wireless communication technology, optical signals, acoustic signals, magnetic induction, and so on) and/or mechanically (such as one or more magnets, mechanical snaps, electro-magnetic connectors, Velcro, and/or other such connectors) connecting to the attachment element 902, the electronic device 901, one or more additional connection mechanisms, and/or additional electronic components in a variety of series, parallel, and/or otherwise arrangements. In such cases, attachment mechanisms and/or electronic devices may be stacked in sequence and may be electrically and/or mechanically connected to one or more of each other.

Moreover, though the additional attachment element 922 is illustrated as an entire band that does not couple to the electronic device 901, it is understood that this is an example. In some implementations, additional attachment elements 922 may comprise segments of a band that may be attached to the attachment element 902 (and/or the electronic device 901 such as where a group of segments is utilized instead of the attachment element 902) in a single and/or multiple layers in a variety of positions (such as where attachment elements 922 and/or 902 have various contacts disposed in a variety of positions on one or more sides). In various implementations, additional attachment elements 922 may or may not electrically and/or mechanically connect to the electronic device 901 in addition to the attachment element 902. In some implementations, the placement and/or number of electrical and/or mechanical connectors on additional attachment elements 922, the attachment element 902, and/or the electronic device 901 may function to limit the number of these items that may be coupled together and/or which out of a group of these items may be coupled together at a particular time.

In various cases, the attachment element 902 and/or the additional attachment element 922 may be associated with one or more functions. In such cases, the attachment element 902 and/or the additional attachment element 922 may be color and/or otherwise coded to indicate such functions. In some cases, the attachment element 902 and/or the additional attachment element 922 may also be color and/or otherwise coded based on aesthetic considerations, to enable users to make a statement regarding personality, and so on.

Figure 9C:
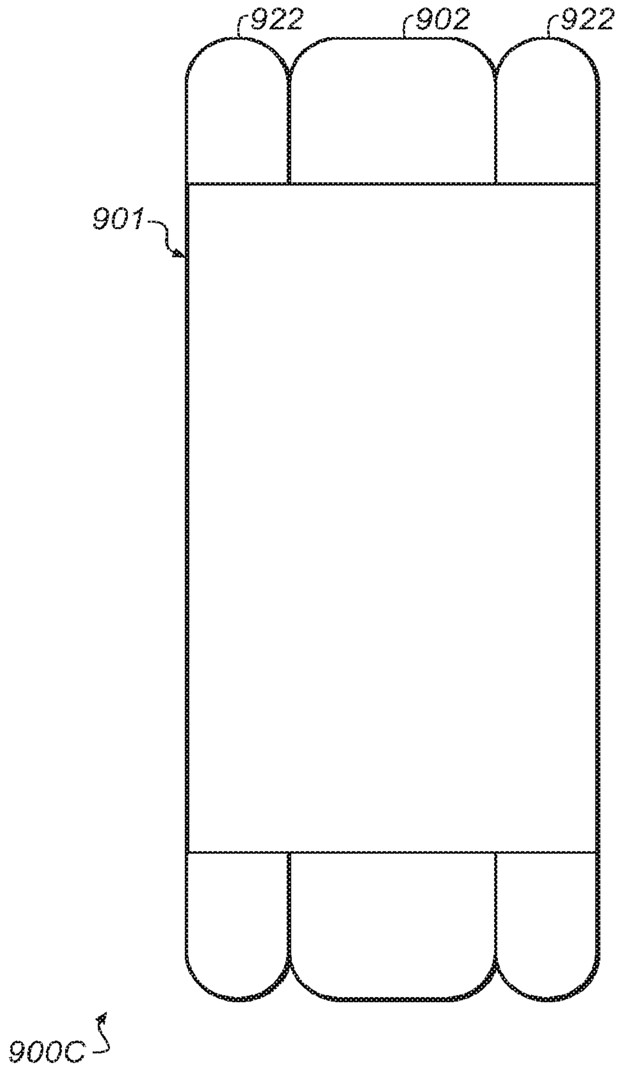
FIG. 9C is a top view of a second alternative version of the ninth embodiment of the system of FIG. 9A.

FIG. 9C is a top view of a second alternative version 900C of the ninth embodiment of the system of FIG. 9A. As compared with 900B, instead of additional attachment elements 922 being wrapped and/or otherwise being arranged around the attachment element 902 the attachment elements 922 and/or the attachment element 902 may include one or more components (such as the additional magnetic contacts 920 and the magnetic contact elements 923) positioned on the sides of the attachment elements 922 and/or the attachment element 902. As illustrated, such components may enable the attachment elements 922 to be electrically and/or mechanically connected to the attachment element 902 in a sideways configuration.

In some implementations, electrical and/or mechanical attachment of multiple attachment elements 902 and 922 may enable one or more combined functionalities. In some cases, such combined functionality may be enabled when at least one of the attachment elements 902 and/or 922 are electrically and/or mechanically attached to the electronic device 901. However, in other cases such combined functionality may be enabled the attachment elements 902 and/or 922 are not electrically and/or mechanically attached to the electronic device 901. Such combined functionality may be enabled from a plurality of various attachment elements 902 and/or 922, multiple attachment elements 902 and/or 922 to be worn at one time by a user (and/or connected via contacts, wireless, connections and so on), or by a singular attachment element 902 and/or 922 with multiple functions.

By way of a first example, such combined functionality may include the combination of a microphone and speaker. Such a combination may enable telephone applications which may and/or may not be dependent on the electronic device 901 for wired and/or wireless connection and/or power.

By way of a second example, such combined functionality may include the combination of a microphone, speaker, and camera. Such a combination may enable one or more videoconferencing and/or other video call applications which may and/or may not be dependent on the electronic device 901 for wired and/or wireless connection and/or power.

By way of a third example, such combined functionality may include the combination of a global positioning system, a battery, and data storage. Such a combination may enable applications such as location tracking of a jogger. In some cases, such an application may be independent of the electronic device 901, though data may be uploaded to the electronic device 901 when reconnected.

By way of a fourth example, such combined functionality may include the combination of a near field communication antenna and a fingerprint reader. Such a combination may enable applications such as a secure wallet which may and/or may not be dependent on the electronic device 901 for data and/or power.

By way of a fifth example, such combined functionality may include the combination of a near field communication antenna, data storage, and a battery. Such a combination may enable applications such as a portable wallet which may and/or may not be independent of the electronic device 901. Financial information such as credit card information may be viewed and/or changed when reconnected to the electronic device 901 in some implementations.

By way of a sixth example, such combined functionality may include the combination of one or more biometric sensors, one or more output components (such as speakers, displays, light emitting diodes, and so on), and one or more wireless communication components (such as Win, 4G, and so on). Such a combination may enable integrated health monitoring devices. Such devices may be programmed with threshold sensor values (e.g. a hear rate level or other values) by a doctor and exceeding these thresholds may trigger doctor-approved instructions (e.g. "Please call your doctor"), set off an alert (e.g. waking a sleep apnea patient), and so on. Data may immediately be sent to a user's doctor, to emergency services, and so on via wireless communication. Application of such a device may be at a patient's home, in a hospital where vitals data may be continuously streamed for various patients (such as patients awaiting doctors in the emergency room), and so on.

Figure 10A:
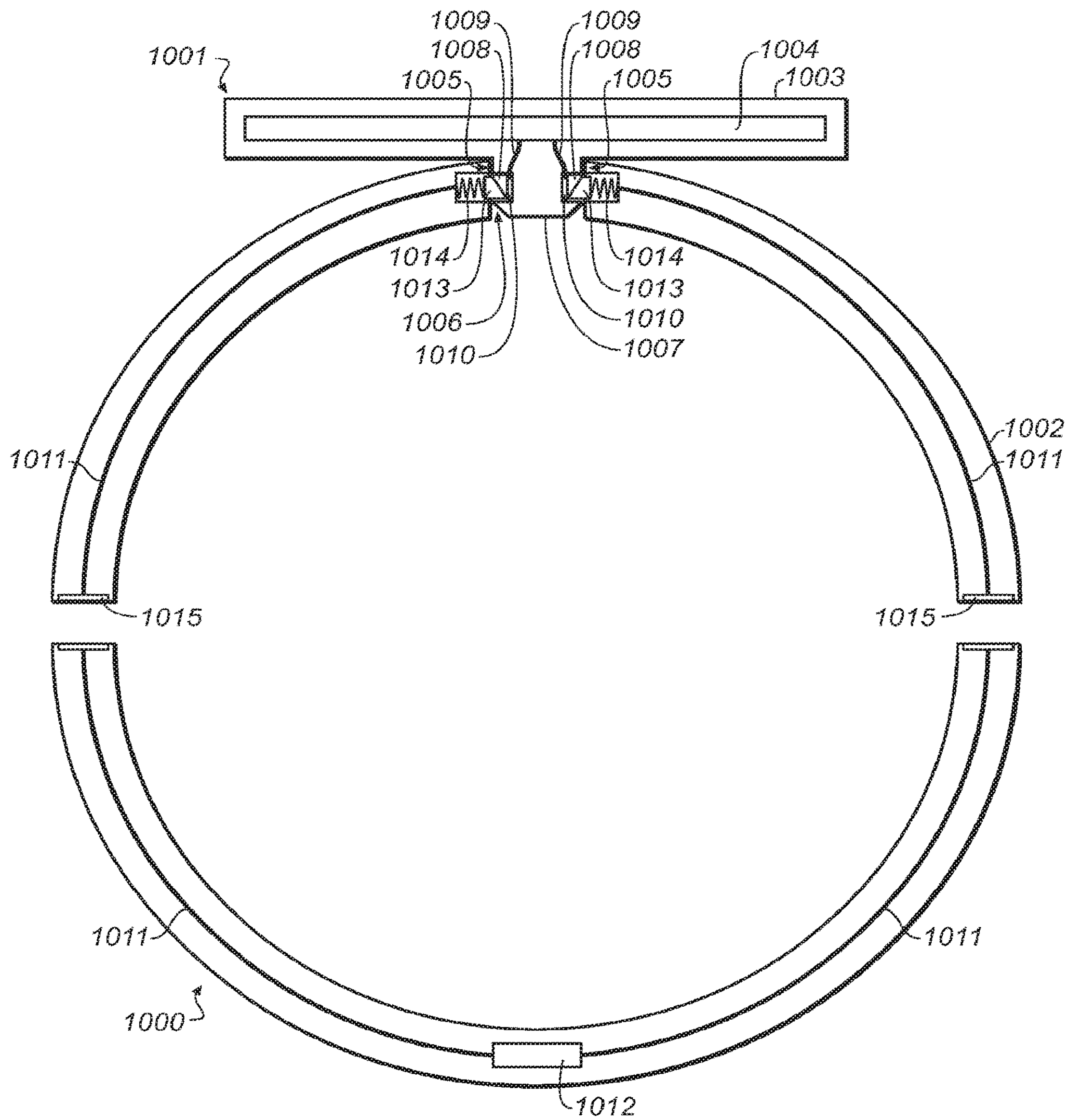
FIG. 10A is a side cross sectional view of a tenth embodiment of a system for connecting an electronic device to an attachment element utilizing an electromechanical snap connection mechanism.

FIG. 10A is a side cross sectional view of a tenth embodiment of a system 1000 for connecting an electronic device 1001 to an attachment element 1002 utilizing an electromechanical snap connection mechanism 1005 and 1006.

Similar to the system 100 of FIG. 1A, the system 1000 includes an electronic device 1001 and an attachment element 1002. The electronic device 1001 may include a housing 1003, one or more electronic components 1004, conductive elements 1009, and a connection mechanism 1005 that includes a plug 1007, notches 1008, contacts 1010. The attachment element 1002 may include conductive elements 1011, one or more electronic components 1012, and a connection mechanism 1006 that includes spring 1014 loaded detents 1013.

Contrasted with to the system 100 of FIG. 1A, the system 1000 includes one or more electrically conductive holes 1015. As illustrated, such electrically conductive holes 1015 may extend through the thickness of the attachment element 1002. However, such electrically conductive holes 1015 may not extend through the width of the attachment element 1002 such that the attachment element 1002 is not separated into pieces. As such, the electrically conductive holes 1015 may allow passage through the attachment element 1002 while still electrically connecting the various portions of the conductive elements 1011.

Figure 10B:
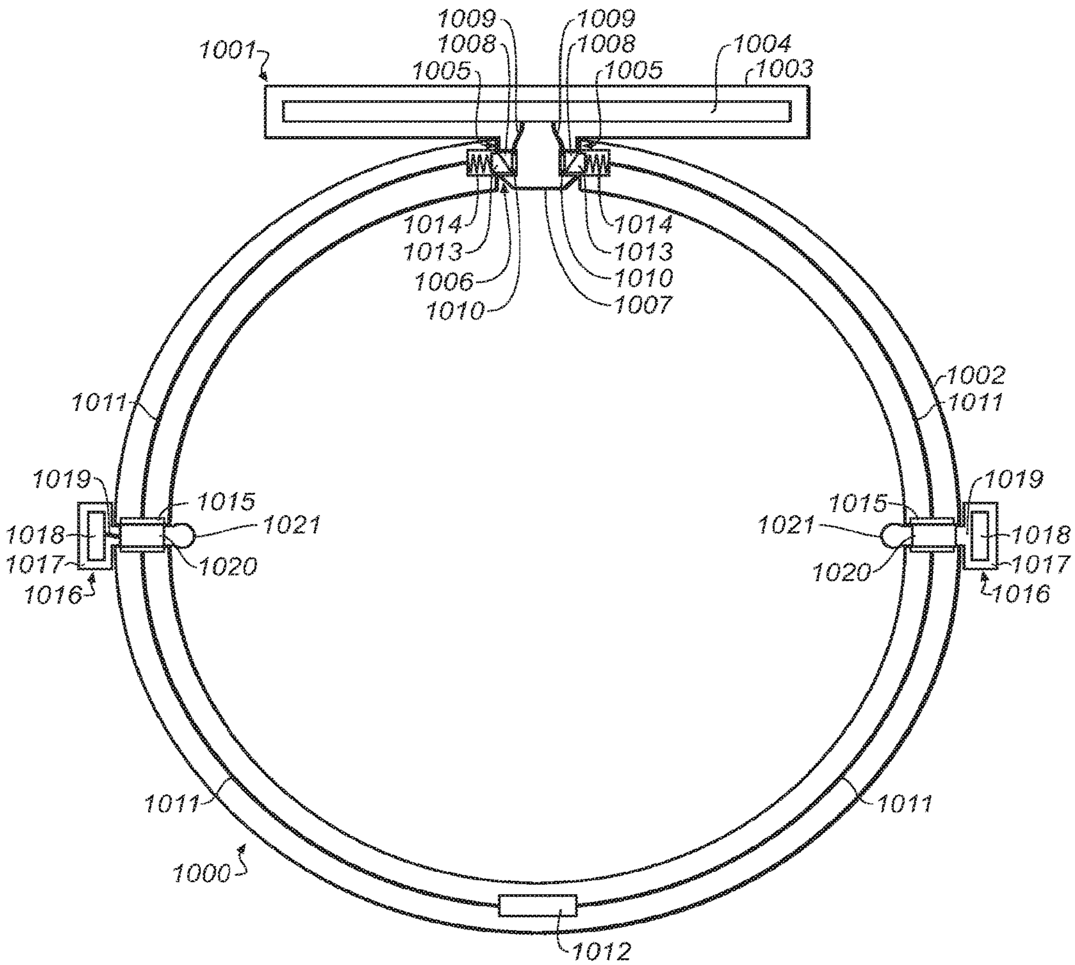
FIG. 10B illustrates the system of FIG. 10A after the electromechanical snap connection mechanism is utilized to mechanically and electrically connect additional electronic devices to the attachment element.

FIG. 10B illustrates the system 1000 of FIG. 10A after a plug 1021 of one or more additional electronic devices 1016 is inserted into at least one of the electrically conductive holes 1015. As illustrated, the additional electronic device 1016 may include a housing 1017, one or more electronic components 1018, a conductive portion 1019, and a plug 1021 with a contact 1020.

As illustrated, the plug 1021 may be tapered such that it may be inserted into and/or removed from the electrically conductive hole 1015 under the application of force, but may otherwise mechanically connect the additional electronic device 1016 to the attachment element 1002 absent the application of such force. Further, when the plug 1021 is inserted into the electrically conductive hole 1015, the contact 1020 may contact the electrically conductive hole 1015.

Further, although the attachment element 1002 is illustrated and described as having electrically conductive holes 1015 for electrically and/or mechanically connecting to additional electronic devices 1016, it is understood that this is an example. In various cases, the attachment elements 1002 may each have other connection mechanisms for electrically and/or mechanically connecting to one or more additional electronic devices 1016.

Further, although the system 1000 is illustrated and described as electrically and/or mechanically connecting two additional electronic devices 1016 to the attachment element 1002, it is understood that this is an example. In various cases, any number of additional electronic devices 1016 may be so connected (such as one, three, or fifteen) without departing from the scope of the present disclosure.

Additionally, although the various systems illustrated in FIGS. 1A-10B are illustrated and described above as utilizing various connection mechanisms, it is understood that these are examples. In various implementations, various connection mechanisms described herein and illustrated in the accompanying figures may be combined into a single implementation without departing from the scope of the present disclosure.

Figure 11:
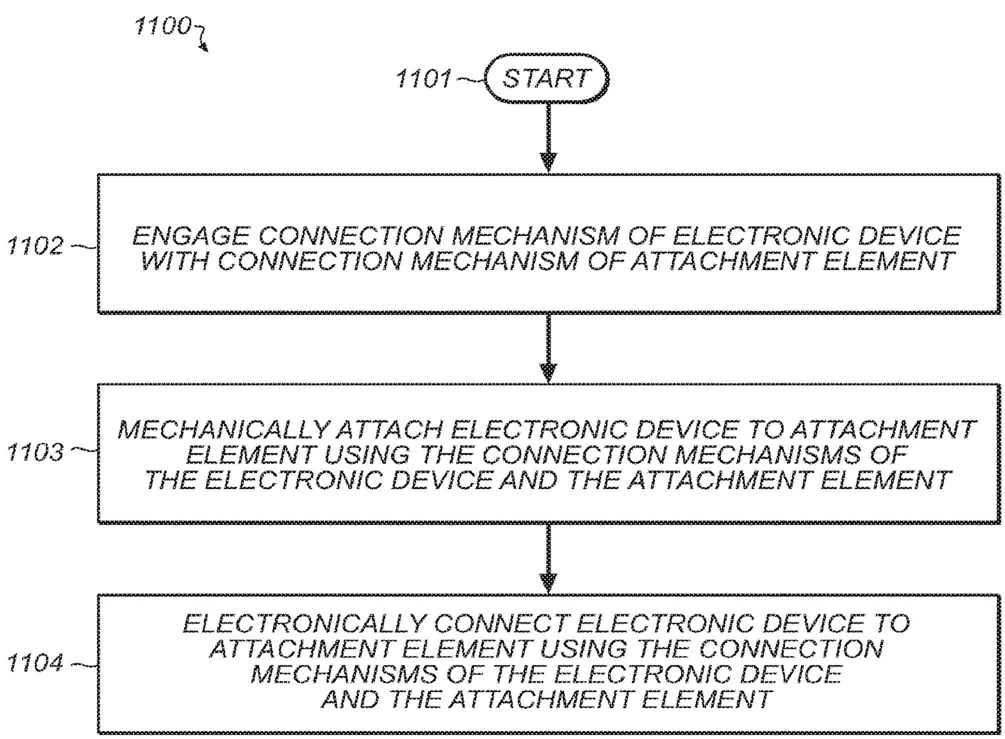
FIG. 11 is a flow chart illustrating a method for connecting a device to an attachment element utilizing a connection mechanism. This method may be performed utilizing any of the systems of FIGS. 1A-10B.

FIG. 11 is a flow chart illustrating a method 1100 for connecting a device to an attachment element utilizing a connection mechanism. This method may be performed utilizing any of the systems of FIGS. 1A-10B.

The flow may begin at block 1101 and proceeds to block 1102 where a connection mechanism of at least one electronic device is engaged with a connection mechanism of at least one attachment device.

The flow then proceeds to block 1103 where the electronic device is mechanically attached to the attachment element utilizing the respective connection mechanisms of the electronic device and the attachment element. The flow then proceeds block 1104 where the electronic device is electrically attached to the attachment element utilizing the respective connection mechanisms of the electronic device and the attachment element.

Although the method 1100 is illustrated as including particular operations performed in a particular order, it is understood that this is an example. In various implementations, various orders of the same, similar, and/or different operations may be performed without departing from the scope of the present disclosure. For example, though the operations 1103 and 1104 of mechanically and electrically attaching the electronic device and attachment element are illustrated and described as distinct operations performed in a linear order, in various implementations such operations may be combined into a single, simultaneous operation.

Figure 12:
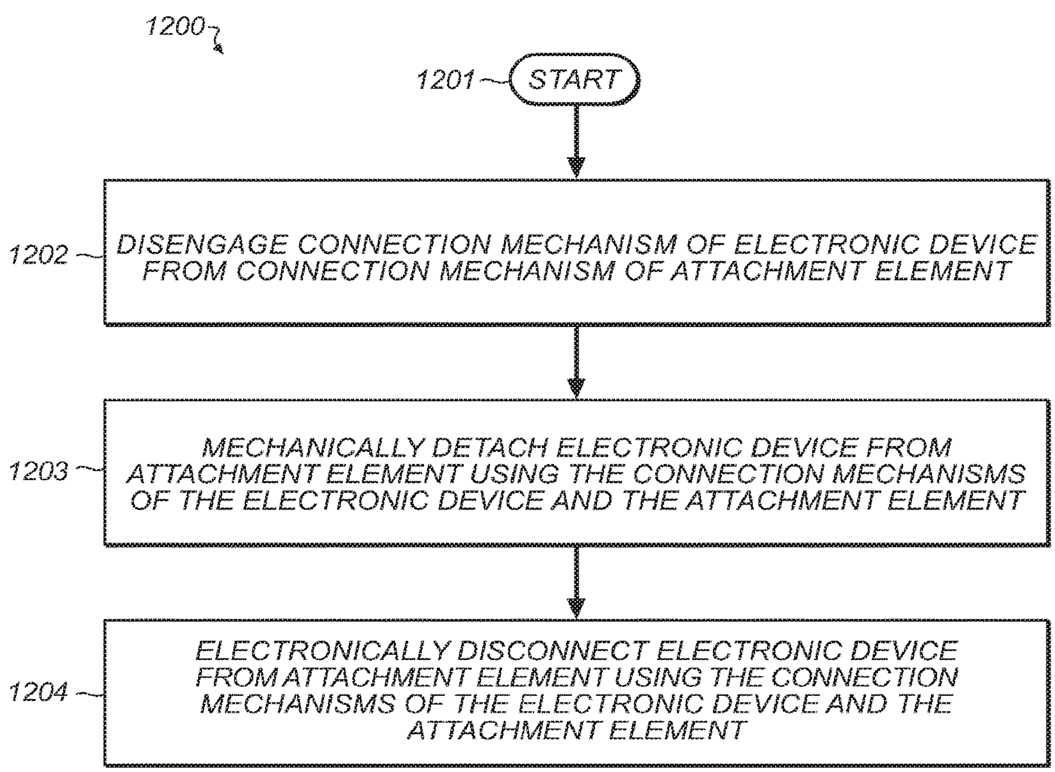
FIG. 12 is a flow chart illustrating a method for disconnecting a device from an attachment element utilizing a connection mechanism. This method may be performed utilizing any of the systems of FIGS. 1A-10B.

FIG. 12 is a flow chart illustrating a method 1200 for disconnecting a device from an attachment element utilizing a connection mechanism. This method may be performed utilizing any of the systems of FIGS. 1A-10B.

The flow may begin at block 1201 and proceeds to block 1202 where a connection mechanism of at least one electronic device is disengaged from a connection mechanism of at least one attachment device.

The flow then proceeds to block 1203 where the electronic device is mechanically detached from the attachment element utilizing the respective connection mechanisms of the electronic device and the attachment element. The flow then proceeds to block 1204 where the electronic device is electrically disconnected from the attachment element utilizing the respective connection mechanisms of the electronic device and the attachment element.

Although the method 1200 is illustrated as including particular operations performed in a particular order, it is understood that this is an example. In various implementations, various orders of the same, similar, and/or different operations may be performed without departing from the scope of the present disclosure. For example, though the operations 1203 and 1204 of mechanically detaching and electrically disconnecting the electronic device from the attachment element are illustrated and described as distinct operations performed in a linear order, in various implementations such operations may be combined into a single, simultaneous operation.

As described above and illustrated in the accompanying figures, the present disclosure discloses systems and methods for electrically and mechanically connecting devices and attachment elements. One or more electronic devices and one or more attachment elements that include one or more electronic components may each include one or more connection mechanisms. The connection mechanisms of the electronic device and the attachment element may be engaged to mechanically and electrically connect the electronic device and the attachment element. Such electrical connection may electrically couple the one or more electrical components of the attachment element to the electronic device.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A system, comprising:
an electronic watch, comprising:
a body defining a first connection mechanism including a notch having overhang portions extending from a base portion at a base of the notch; and
a processing unit located in the body, wherein the body comprises an electrical contact positioned in the base portion of the notch that is electrically connected to the processing unit; and
a band segment configured to attach the electronic watch to a body part of a user, comprising:
a second connection mechanism; and
an electronic component; wherein:
the second connection mechanism comprises a detent mechanism that is configured to be displaced by the electronic watch while the band segment is being attached to the electronic watch; and
the electronic watch and the band segment are mechanically and electrically coupled by an engagement between the first connection mechanism and the second connection mechanism.

2. The system of claim 1, wherein at least one of the first connection mechanism or the second connection mechanism comprises a mechanical connection portion and an electrical connection portion.

3. The system of claim 1, wherein at least one of the first connection mechanism or the second connection mechanism comprises a connection portion that both electrically and mechanically couples the electronic watch to the band segment.

4. The system of claim 1, wherein the electronic watch is attachable to the band segment while the band segment is attached to the body part.

5. The system of claim 1, wherein the electronic watch is detachable from the band segment while the band segment is attached to the body part.

6. The system of claim 1, wherein at least one of the electronic watch or the band segment further comprises an additional connection mechanism that connects to an additional electronic watch or an additional band segment.

7. The system of claim 1, wherein the electronic component comprises at least one battery, connection adapter, connection cable, storage component, computing component, communication component, global positioning system, barcode reader, credit card processing unit, scanner, printer, display, speaker, or microphone.

8. The system of claim 1, wherein the band segment includes a connector operable to couple the electronic watch to at least one of a computing device or a power source when the electronic watch is attached to the band segment.

9. The system of claim 1, wherein the band segment is configured to operate as a charger for the electronic watch.

10. The system of claim 1, wherein the electronic watch is utilizable in a plurality of orientations and is attachable to the band segment in each of the plurality of orientations.

11. An electronic device, comprising:
a watch, comprising:
a body defining a notch having overhang portions extending from a base portion at a base of the notch; and
a processing unit located in the body, wherein the body comprises an electrical contact positioned in the base portion of the notch that is electrically connected to the processing unit; and
a strap operable to couple the watch to a user, comprising:
an electronic component; and
a detent that is configured to be compressed by the body while being engaged with the notch to mechanically connect the body and the strap and electrically connect the processing unit and the electronic component.

12. The electronic device of claim 11, wherein the detent is moveable into the strap and out of the strap.

13. The electronic device of claim 11, wherein the detent comprises an electrical contact.

14. The electronic device of claim 11, wherein the strap further comprises a connector that connects the strap to an additional strap or an additional electronic device.

15. The electronic device of claim 11, wherein:
the body defines an additional notch; and
the strap includes an additional detent that inserts into the additional notch to connect the body and the strap.

16. An electronic watch, comprising:
a housing that defines a notch having overhang portions extending from a base portion at a base of the notch;
a first electronic component located in the housing, wherein the housing comprises an electric contact positioned in the base portion of the notch that is electrically connected to the first electronic component; and
a belt operable to couple the housing to a user, comprising:
a second electronic component located in the belt;
an end that is configured to be inserted into the notch; and
a pin coupled to the end and configured to be displaced by the housing when the end is inserted into the notch to mechanically couple the belt and the housing and electrically connect the first and second electronic components.

17. The electronic watch of claim 16, wherein the belt is detachable from the housing when force is exerted on the pin to disengage the pin from the notch.

18. The electronic watch of claim 16, wherein the housing comprises an electronic contact positioned in the notch that is electrically connected to the first electronic component.

19. The electronic watch of claim 16, wherein pressure exerted by the housing on the pin displaces the pin.

20. The electronic watch of claim 16, wherein:
the housing defines an additional notch wherein the notch and the additional notch are disposed on opposite ends of the housing;
the belt includes an additional end; and
the additional end is configured to insert into the additional notch to couple the belt and the housing.

* * * * *